(12) United States Patent
Lander

(10) Patent No.: US 10,914,280 B2
(45) Date of Patent: Feb. 9, 2021

(54) WAVE POWER GENERATOR

(71) Applicant: Arthur Lander, Vienna, VA (US)

(72) Inventor: Arthur Lander, Vienna, VA (US)

( * ) Notice: Subject to any disclaimer, the term of this patent is extended or adjusted under 35 U.S.C. 154(b) by 0 days.

(21) Appl. No.: 16/433,354

(22) Filed: Jun. 6, 2019

(65) Prior Publication Data
US 2020/0386201 A1 Dec. 10, 2020

(51) Int. Cl.
*F03B 13/16* (2006.01)
*H02K 7/10* (2006.01)
*H02K 7/18* (2006.01)
*H02K 7/116* (2006.01)

(52) U.S. Cl.
CPC .......... *F03B 13/16* (2013.01); *H02K 7/1004* (2013.01); *H02K 7/116* (2013.01); *H02K 7/1853* (2013.01); *F05B 2260/503* (2013.01); *F05B 2260/505* (2013.01)

(58) Field of Classification Search
CPC ........ F03B 13/16; H02K 7/116; H02K 7/1004
USPC .............................. 290/42, 53; 60/500–509
See application file for complete search history.

(56) References Cited

U.S. PATENT DOCUMENTS

| | | | | |
|---|---|---|---|---|
| 987,685 A * | 3/1911 | Atkinson | ............. | F03B 13/186 60/507 |
| 1,123,054 A * | 12/1914 | Winslow | ............... | F03B 13/187 417/331 |
| 1,393,472 A * | 10/1921 | Williams | ............. | F03B 13/262 290/42 |
| 3,567,953 A * | 3/1971 | Lord | ..................... | F03B 13/262 290/42 |
| 3,894,241 A * | 7/1975 | Kaplan | ............... | F03B 13/1865 290/42 |
| 4,208,877 A * | 6/1980 | Evans | ................. | F03B 13/1885 60/495 |
| 4,228,360 A * | 10/1980 | Navarro | ............. | F03B 13/1885 290/43 |
| 4,242,593 A * | 12/1980 | Quilico | ............... | F03B 13/1885 290/42 |
| 4,355,511 A * | 10/1982 | Jones | .................. | F03B 13/1845 290/42 |
| 4,379,235 A * | 4/1983 | Trepl, II | ............. | F03B 13/1815 290/53 |
| 4,434,375 A * | 2/1984 | Taylor | ................. | F03B 13/1885 290/53 |
| 4,539,484 A * | 9/1985 | Suggs | ................. | F03B 13/1885 290/53 |
| 5,066,867 A * | 11/1991 | Shim | .................... | F03B 13/1885 290/53 |
| 5,359,229 A * | 10/1994 | Youngblood | ....... | F03B 13/1855 290/42 |
| 5,424,582 A * | 6/1995 | Trepl, II | ............. | F03B 13/1865 290/42 |
| 5,578,889 A * | 11/1996 | Epstein | ................... | F03B 13/14 290/53 |
| 5,889,336 A * | 3/1999 | Tateishi | ............. | F03B 13/1865 290/43 |
| 6,864,592 B1 * | 3/2005 | Kelly | .................. | F03B 13/1855 290/42 |

(Continued)

*Primary Examiner* — Pedro J Cuevas
(74) *Attorney, Agent, or Firm* — Klima Law; William L. Klima

(57) ABSTRACT

A wave power generator comprising a chain drive arrangement. The wave power generator comprising a float connected to one end of a retractable chain and a retractable device connected to an opposite end of the retractable chain.

20 Claims, 19 Drawing Sheets

(56) References Cited

U.S. PATENT DOCUMENTS

| | | | | |
|---|---|---|---|---|
| 7,444,810 B2* | 11/2008 | Olson | | F03B 13/1815 60/495 |
| 7,845,880 B2* | 12/2010 | Rasmussen | | E03B 9/08 290/42 |
| 7,878,734 B2* | 2/2011 | Bull | | F03B 13/1845 405/76 |
| 8,093,736 B2* | 1/2012 | Raftery | | F03B 13/1885 290/42 |
| 8,276,377 B2* | 10/2012 | Patton | | F03B 13/1865 290/42 |
| 8,581,433 B2* | 11/2013 | Sidenmark | | F03B 13/1815 290/53 |
| 8,614,520 B2* | 12/2013 | Rohrer | | F03B 13/182 290/42 |
| 9,016,055 B2* | 4/2015 | Dragic | | F03B 13/1875 60/504 |
| 9,127,640 B2 | 9/2015 | Rohrer | | F03B 13/182 |
| 9,140,230 B2 | 9/2015 | Peckolt | | F03B 13/16 |
| 9,284,940 B2 | 3/2016 | Lee | | F03B 13/186 |
| 9,587,620 B2 | 3/2017 | Rhinefrank | | F03B 13/14 |
| 9,790,914 B2 | 10/2017 | Lee | | F03B 13/1855 |
| 9,863,395 B2 | 1/2018 | Rohrer | | F03B 13/182 |
| 10,087,909 B2* | 10/2018 | Sheldon-Coulson | | F03B 13/264 |
| 10,094,356 B2 | 10/2018 | Rohrer | | H02K 7/18 |
| 10,174,740 B2 | 1/2019 | Kimura | | F03B 13/20 |
| 10,190,568 B2 | 1/2019 | Gregory | | F03B 15/02 |
| 10,227,961 B2 | 3/2019 | Dragic | | F03B 13/187 |
| 10,240,575 B2 | 3/2019 | Dragic | | F03B 13/1885 |
| 10,259,543 B2 | 4/2019 | Stevens | | B63B 35/44 |
| 10,273,931 B2 | 4/2019 | Ohlsson | | F03B 13/20 |
| 10,408,187 B2 | 9/2019 | Duffy | | F03B 13/22 |
| 10,473,083 B2 | 11/2019 | Sheldon-Coulson | | F03B 13/1885 |
| 10,619,618 B2 | 4/2020 | Sheldon-Coulson | | F16H 19/06 |
| 10,668,990 B2 | 6/2020 | Sheldon-Coulson | | B63B 39/06 |
| 10,731,622 B2 | 8/2020 | Greco | | F03B 13/181 |
| 10,788,010 B2 | 9/2020 | Rohrer | | F03B 13/1855 |
| 2002/0067043 A1* | 6/2002 | Ovadia | | F03B 13/1815 290/53 |
| 2007/0018458 A1* | 1/2007 | Martinez | | F03B 13/1885 290/53 |
| 2008/0169653 A1* | 7/2008 | Olson | | F03B 13/1815 290/53 |
| 2008/0272600 A1* | 11/2008 | Olson | | F03B 13/1815 290/53 |
| 2009/0146429 A1* | 6/2009 | Protter | | F03B 13/20 290/53 |
| 2009/0211240 A1* | 8/2009 | Patton | | F03B 13/1865 60/498 |
| 2009/0212562 A1* | 8/2009 | Jaugilas | | F03B 13/262 290/42 |
| 2010/0043425 A1* | 2/2010 | Dragic | | F03B 13/186 60/504 |
| 2010/0045044 A1* | 2/2010 | Patterson | | F03B 13/1865 290/53 |
| 2010/0064679 A1* | 3/2010 | Straume | | F03B 13/1885 60/507 |
| 2010/0102562 A1* | 4/2010 | Greenspan | | F03B 13/1885 290/53 |
| 2010/0109329 A1* | 5/2010 | Brantingham | | F03B 13/1845 290/53 |
| 2011/0012358 A1* | 1/2011 | Brewster | | F03B 13/1885 290/53 |
| 2011/0018275 A1* | 1/2011 | Sidenmark | | F03B 13/1815 290/53 |
| 2012/0235413 A1* | 9/2012 | Piccinini | | F03B 13/1885 290/53 |
| 2012/0317970 A1* | 12/2012 | Edvardsen | | F03B 13/189 60/496 |
| 2013/0091838 A1* | 4/2013 | Lee | | F03B 13/186 60/506 |
| 2013/0127168 A1* | 5/2013 | Dragic | | F03B 13/186 290/53 |
| 2014/0338321 A1* | 11/2014 | You | | F03B 13/189 60/496 |
| 2015/0082785 A1* | 3/2015 | Rohrer | | F03B 13/182 60/500 |
| 2015/0211478 A1* | 7/2015 | Dragic | | F03B 13/1875 60/505 |
| 2015/0252777 A1* | 9/2015 | Rhinefrank | | F03B 13/14 290/53 |
| 2016/0032887 A1* | 2/2016 | Patton | | F03B 13/262 60/504 |
| 2016/0138556 A1* | 5/2016 | Lee | | F03B 13/1855 290/42 |
| 2016/0265506 A1* | 9/2016 | Kimura | | F03B 13/1845 |
| 2017/0101977 A1* | 4/2017 | Sidenmark | | F03B 13/1845 |
| 2017/0226984 A1* | 8/2017 | Gregory | | F03B 13/1895 |
| 2018/0306165 A1* | 10/2018 | Rohrer | | F03B 13/186 |
| 2018/0363619 A1* | 12/2018 | Sheldon-Coulson | | F03B 13/16 |
| 2018/0363620 A1* | 12/2018 | Scoggins | | F03B 13/186 |
| 2019/0040840 A1* | 2/2019 | Rohrer | | F03B 13/20 |
| 2019/0249642 A1* | 8/2019 | Dragic | | F03B 13/1815 |
| 2019/0285044 A1* | 9/2019 | Dragic | | F03B 13/186 |
| 2019/0323477 A1* | 10/2019 | Blodgett | | H02K 7/1853 |
| 2019/0360452 A1* | 11/2019 | Qu | | F03B 13/1875 |
| 2020/0011289 A1* | 1/2020 | Steenstrup | | F03B 13/20 |
| 2020/0198739 A1* | 6/2020 | Sheldon-Coulson | | B63B 39/06 |
| 2020/0240388 A1* | 7/2020 | Dragic | | H02K 7/06 |

* cited by examiner

WAVE POWER GENERATOR

FIELD

The present invention is directed to a wave power generating device for generating power from wave action. The wave power generating device can be installed or attached to a stationary platform or base such as a piling or pier disposed within a body of water having wave action.

BACKGROUND

Currently, there exists a need for a wave power generator for converting wave energy into an electrical supply. This "green" energy application is essentially free, except for the capital investment to make, install, and maintain the wave power generator.

SUMMARY

The present invention is directed to a wave power generating device that can be installed on a stationary object or support such as a dock or pier having a piling, post, pole, or other stationary object located at a position in proximity to where waves regularly exist, and secured from movement relative to the sea bed to prevent any and down movement of the wave power generating device. Specifically, the wave power generating device is configured to that a float of the power generating device is subjected to wave action to provide power generation.

The wave generating device comprises a retractable chain or belt connected at one end to a float and connected at an opposite end to a retractable cord device. The movable chain or belt cooperates with an electrical power generating device to drive (e.g. move, propel, translate, rotate) and operate the electrical power generating device to generate power. For example, the electrical power generating device is an electrical generator having one or more gears or cogs cooperating with the chain or belt.

The float of the wave generating device moves upwardly and downwardly at the water surface by wave action. When the float moves upwardly by a wave, the retractable chain or belt is pulled outwardly from the wave generating device by the float rising, and operates the electrical power generating device. When the float moves downwardly by the wave action, the retractable chain or belt is retracted or pulled inwardly into the wave generating device by the retractable cord device.

The power generating device can be operated by the moving retractable chain or belt. The power generating device can be fitted with a chain pulley or belt pulley configured to "free wheel" device (e.g. chain gear or belt cog configured to "free wheel" when rotated in one direction and engage when rotated in the opposite direction) so that the retractable chain drives the power generating device in only one direction. Alternatively, the power generating device can be configured to be driven in both direction of movement of the retractable chain or belt.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, and wherein the retractable chain drives the electrical power generating device in at least one direction of movement of the retractable chain due to wave movement.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, the retractable device comprising a weight for retracting the retractable chain under tension, wherein the retract cord is pulled out of the retractable device by an incoming wave lifting the float, and is retracted back into the retractable device under tension by the retractable when the wave is moving past the float, and wherein the retractable chain drives the electrical power generating device in at least one direction of movement of the retractable chain due to wave movement.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, the retractable device comprising a spring for retracting the retractable chain under tension, wherein the retract cord is pulled out of the retractable device by an incoming wave lifting the float, and is retracted back into the retractable device under tension when the wave is moving past the float, and wherein the retractable chain drives the electrical power generating device in at least one direction of movement of the retractable chain due to wave movement.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, and wherein the retractable chain drives the electrical power generating device in at least one direction of movement of the retractable chain due to wave movement, wherein the support comprise a frame or tank structure and arrangement.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, and wherein the retractable chain drives the electrical power generating device in at least one direction of movement of the retractable chain due to wave movement, wherein the electrical power generating device is an electrical generator.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, and wherein the retractable chain drives the electrical power generating device in at least one direction of movement of the retractable chain due to wave movement, wherein the retractable device comprises at least one weight.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, and wherein the retractable chain drives the electrical power generating device in at least one direction of movement of the retractable chain due to wave movement, wherein the retractable device comprises at least one weight, and wherein the weight is configured for maintaining tension on the retractable chain.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, and wherein the retractable chain drives the electrical power generating device in at least one direction of movement of the retractable chain due to wave movement, wherein the retractable device comprises at least one weight, and wherein the weight is configured for retracting the retractable chain into the retractable device.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, wherein the retractable chain drives the electrical power generating device in at least one direction of movement of the retractable chain due to wave movement, and wherein the retractable device comprises at least one spring.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, wherein the retractable chain drives the electrical power generating device in at least one direction of movement of the retractable chain due to wave movement, wherein the retractable device comprises at least one spring, and wherein the spring is configured for maintaining tension on the retractable chain.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, wherein the retractable chain drives the electrical power generating device in at least one direction of movement of the retractable chain due to wave movement, wherein the retractable device comprises at least one spring, and wherein the spring is configured for retracting the retractable chain into the retractable device.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, wherein the retractable chain drives the electrical power generating device in at least one direction of movement of the retractable chain due to wave movement, wherein the retractable device comprises a retractable chain accumulator.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, wherein the retractable chain drives the electrical power generating device in at least one direction of movement of the retractable chain due to wave movement, wherein the retractable device comprises a retractable chain accumulator, and wherein the accumulator comprises multiple chain pulleys for supporting the retractable chain under tension.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, wherein the retractable chain drives the electrical power generating device in at least one direction of movement of the retractable chain due to wave movement, wherein the retractable device comprises a retractable chain accumulator, wherein the accumulator comprises multiple chain pulleys for supporting the retractable chain under tension, and wherein the accumulator further comprises at least one weight configured for maintaining the retractable chain under tension.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, wherein the retractable chain drives the electrical power generating device in at least one direction of movement of the retractable chain due to wave movement, wherein the retractable device comprises a retractable chain accumulator, and wherein the accumulator further comprises at least one spring configured for maintaining the retractable chain under tension.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, wherein the retractable chain drives the electrical power generating device in at least one direction of movement of the retractable chain due to wave movement, and wherein the retractable device comprises multiple frame members each fitted with at least one chain pulley to cooperate with the retractable chain.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, wherein the retractable chain drives the electrical power generating device in at least one direction of movement of the retractable chain due to wave movement, and wherein the retractable device comprises multiple frame members each fitted with at least one chain pulley to cooperate with the retractable chain, and wherein the retractable comprises two or more spaced apart vertically oriented frame members.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, and wherein the retractable chain drives the electrical power generating device in at least one direction of movement of the retractable chain due to wave movement, further comprising a support configured to mount the retractable device, the support being configured so that the float is subject to wave action.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, and wherein the retractable chain drives the electrical power generating device in at least one direction of movement of the retractable chain due to wave movement, further comprising a support configured to mount the retractable device, the support being configured so that the float is subject to wave action, wherein the support is a dock or pier or piling.

The presently described subject matter is directed to a wave power generating device, comprising or consisting of: a support; an electrical power generating device mounted on the support, the electrical power generating device comprising an input shaft; a gear pulley connected to input shaft of the electrical power generating device; a retractable chain cooperating with the gear pulley of the electrical power generating device to drive the electrical power generating device; a float connected to one end of the retractable chain; and a retractable device connected to an opposite end of the retractable chain, the retractable device configured for allowing the retractable chain to be pulled out of the retractable device under tension and retracting the retractable chain under tension, wherein the retract cord is pulled out of the retractable device by an incoming wave lifting the float, and is retracted back into the retractable device by the retractable device when the wave is moving past the float, and wherein the retractable chain drives the electrical power generating device in at least one direction of movement of the retractable chain due to wave movement, wherein the chain drive arrangement drives the electrical power generating device in both directions of movement of the retractable chain.

DETAILED DESCRIPTION

A first wave power generating device 10 according to the present invention is shown in FIGS. 1-4.

The wave power generating device 10 can include or be installed on a stationary base or platform (e.g. dock, pier, pile, piling, post, pole, pillar, wall, dock or pier component or part, or otherwise any vertical oriented structure) located in or adjacent to a body of water having waves providing wave action. The wave power generating device 10 is installed to be fixed against upward or downward movement.

Figure 1:
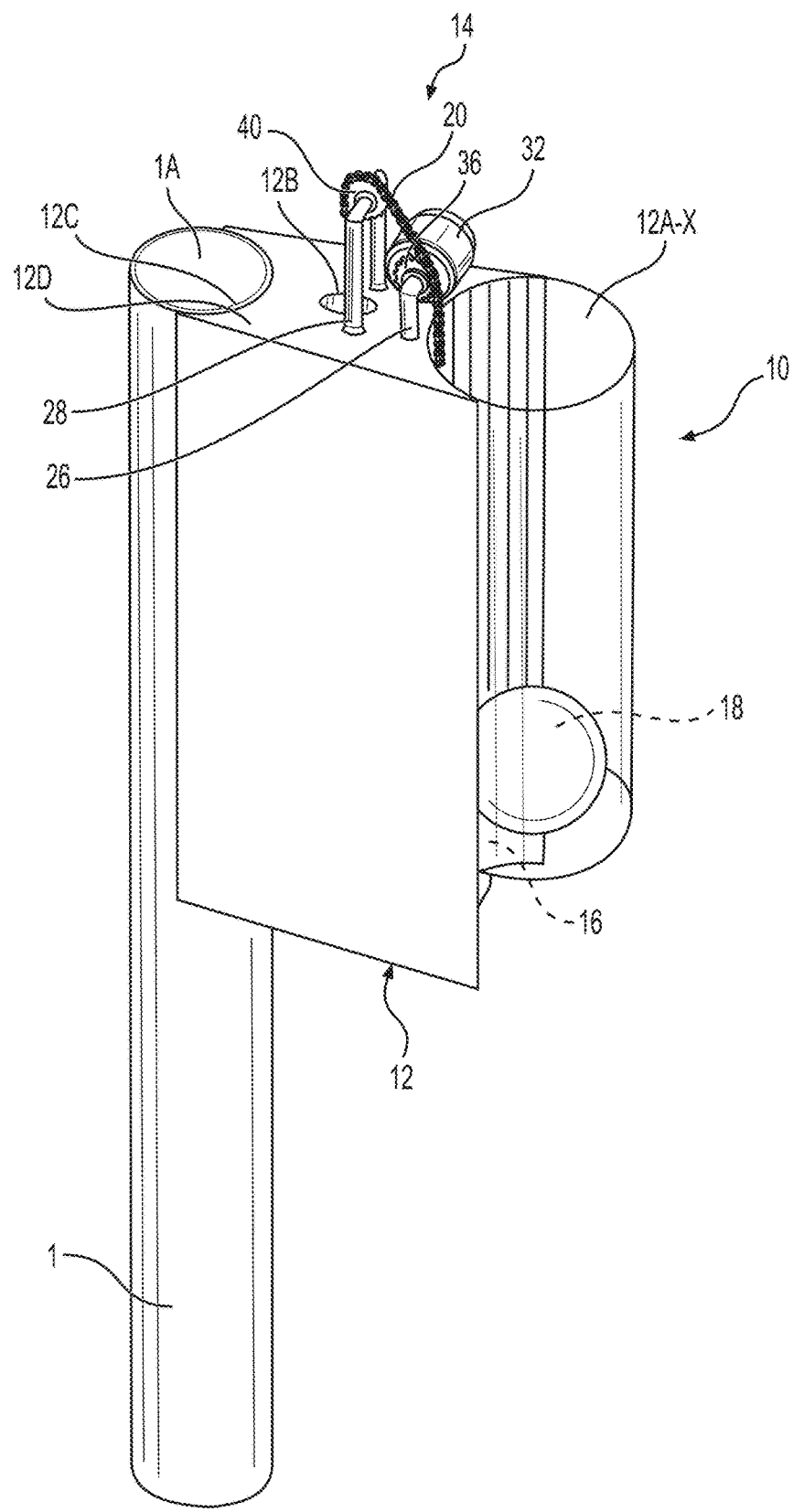
FIG. 1 is a perspective view of a first power generating device according to the present invention.
Figure 2:
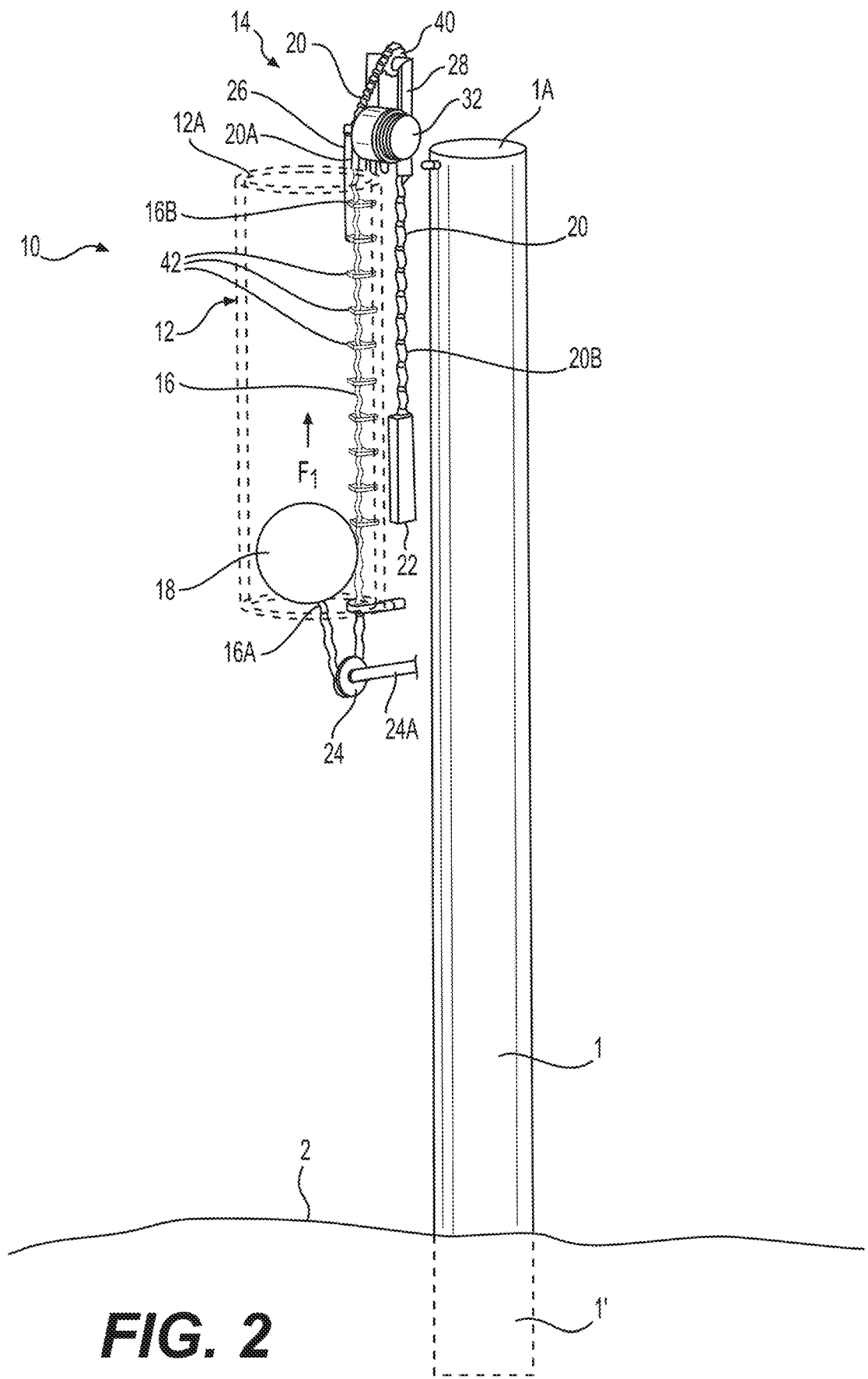
FIG. 2 is another perspective view of the power generating device shown in FIG.
Figure 3:
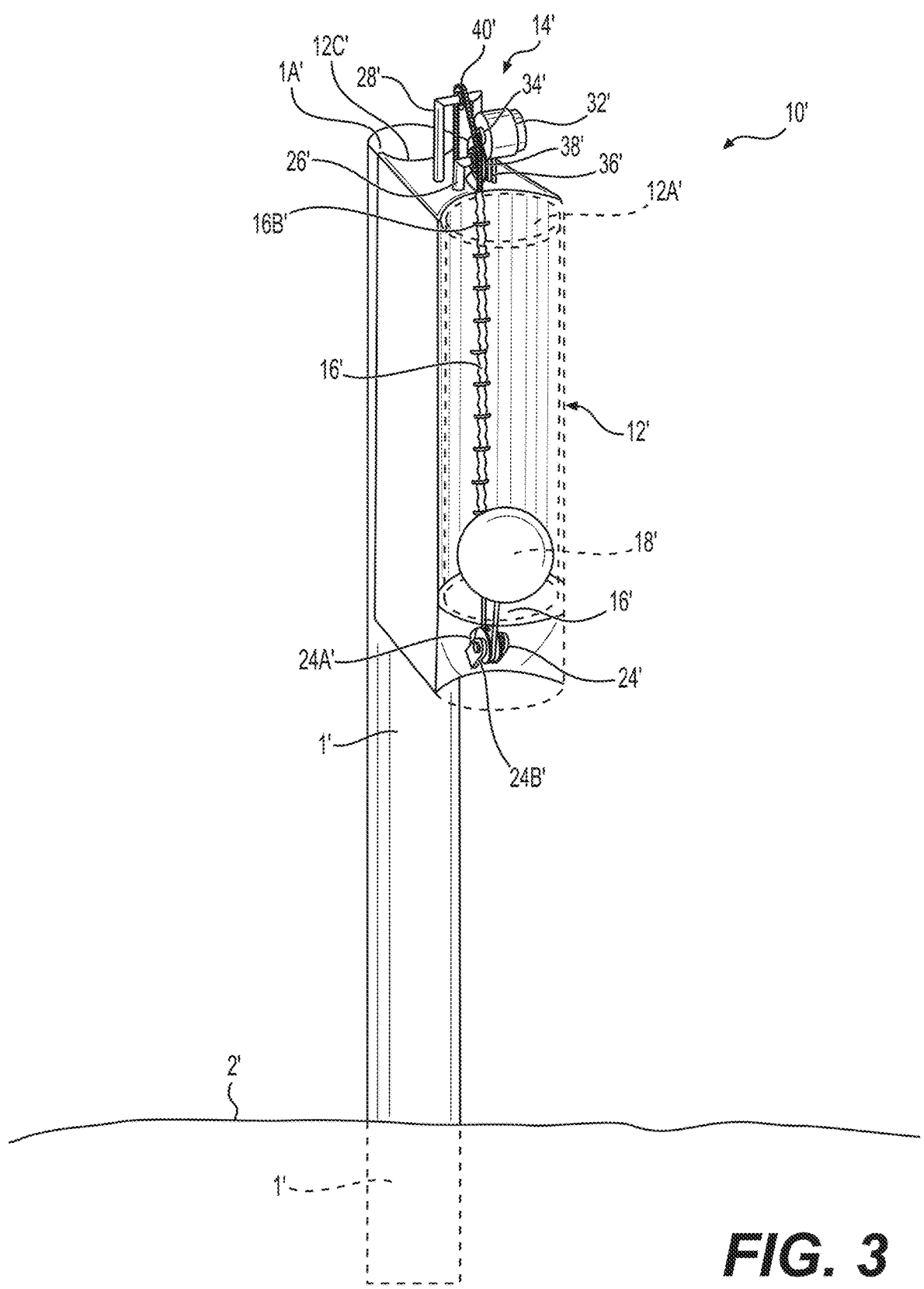
FIG. 3 is a perspective view of a modified power generating device shown in FIG. 1, however, with the electrical generator modified with a pinion gear cooperating with a spur gear for driving the electrical generator.

For example, the wave power generating device 10 is shown installed on a piling 1 in FIGS. 1-3. The piling 1 for example, can be part of the dock or pier. The lower end 1' of the piling 1, for example, is anchored or fixed (e.g. by burying, drilling, excavating, cementing) into the floor 2 (FIG. 2) of a body of water so that the piling 1 is stationary with respect to the floor 2 (e.g. sea bed or floor) so that when the wave power generating device 10 is mounted on the piling 1, it is also stationary relative to the floor 2 at the location of the piling 1.

The wave power generating device 10 comprises a support 12 connectable or connected to the piling 1 and a retractable cord device 14 connected to or mounted onto the support 12. For example, the support 2 is fixed to an upper end of piling 1 by one or more fasteners such as galvanized bolts, screws, and/or custom fastener(s)).

The retractable cord device 14 comprises a retractable cord 16; a float 18 connected to the lower end 16a of the retractable cord 16 and movably disposed within the vertical tunnel 12A of the support 12; a retractable chain 20 connected at an upper end 20A to an upper end 16B of the retractable cord 16; a weight 22 (FIG. 2) connected to a lower end 20B of the chain 20 and movably disposed within the vertical tunnel 12B of the support 12; a lower retractable cord pulley 24 mounted on the support 12 by a bracket 12B below the vertical tunnel 12A in the support 12; a first frame 26 mounted on the support 12; an electrical power generator 32 (e.g. electrical generator, electrical alternator) having a first chain pulley 36 (FIG. 3) directly connected to the output shaft of the electrical power generator 32 and mounted on the first frame 26 and driven by the chain 20; and a second chain pulley 40 rotatably mounted on a second frame 28 and freely rotating and supporting movement of the retractable chain 20.

The first frame 26 and second frame 28 are spaced apart while the second frame 28 is taller than the first frame 26.

The support 12 can be a frame, fabricated structure, a plate fabricated structure (e.g. like a tank), and/or a formed structure (e.g. assembled, machined, molded, extruded) to the shape shown in FIG. 1. The support 12 is provided with a vertical tunnel 12A (e.g. fixed diameter cylindrical-shaped tunnel) extending from the top end to the bottom end of the support 12 to accommodate vertical movement of the float inside the tunnel 12A. Alternatively, the vertical tunnel 12A can be cylindrical-shaped wall at least partially open and providing access to the outside water environment while still being confining movement of the float 18 within the vertical tunnel 12A. For example, the cylindrical-shaped wall of the vertical tunnel 12A can have an open vertical slot extending along at least a portion of the pathway of movement of the float 18 along the length of the vertical tunnel 12A.

The retractable cord device 14 includes the retractable cord pulley 24 (FIG. 2) having an axle 24A mounted on a bracket 24B, which is connected to the support 12. The retractable cord pulley 24 is located below and centered relative to the vertical tunnel 12A of the support 12. Specifically, the retractable cord pulley 24 is located adjacent to and centered on a lower end of the vertical tunnel 12A of the support 12. The side 12D (FIG. 1) of the support 12 connecting to the round piling 1 can have a cylindrically-shaped concave surface (i.e. when viewing from the top) configured to cooperate with the cylindrical-shaped outer surface of the piling 1, as shown in FIG. 1. Specifically, the cylindrical-shaped convex outer surface of the round piling 1 nests within the cylindrical-shaped concave surface of the side 12D of the support 12 to make a strong self-aligning connection between the support 12 and the piling 1 when assembled.

The support 12, for example, can be constructed, assembled, fabricated, machined, formed, molded, and/or made of extruded plastic material (e.g. fiberglass, composite material, Kevlar, carbon graphite, polyurethane, polyethylene, polypropylene). Alternatively, the support 12 can be constructed, assembled, fabricated, machined, stamped or formed from rust proof metal such as galvanized steel, anodized aluminum, stainless steel, brass, bronze, or other corrosion resistant metal. For example, the support 12 is fabricated from sheet metal parts (e.g. cut, bent, formed, machined metal plate parts assembled together, for example, by welding, rolling, or crimping). For example, the support 12 can be constructed similar to a liquid holding tank (e.g. fuel tank).

The retractable cord device 14 comprises the chain gear 34 mounted directly onto the output shaft of the electrical power generator 32, as shown in FIGS. 1 and 2. The retractable chain 20 cooperates with and drives chain gear 36 and the electrical power generator 32 when moving in one direction or in both directions depending on the particular configuration of the chain gear pulley 32 and/or the electrical power generator 32. For example, the chain gear 36 can be configured to allow the chain gear 36 to freewheel relative to the output shaft of the electrical power generator 32 when the chain 20 moves in one direction relative to the chain gear 36. Specifically, a free wheel mechanism or arrangement can be provided between the chain gear 36 and the output shaft of the electrical power generator 32 to provide a chain drive arrangement so that the chain gear 36 drives the electrical power generator 32 in one direction of rotation and then freewheels when the retractable chain 20 moves in the opposite direction of rotation. As another example, the chain gear 36 is fixed to the output shaft of the electrical power generator 32 so that the retractable chain 20 drives the electrical power generator 32 in both directions of rotation. The back-and-forth movement of the retractable chain 20 engaging the chain gear 36 drives the output shaft of the electrical power generator 32 is both directions of rotation. As a further alternative, the chain gear 36 can be configured to connect or disconnect electronically (e.g. remote-controlled switch or controlled by microprocessor) to engage or disengage. Thus, various combinations of engagement and/or disengagement of the moving retractable chain 20 driving the electrical power generator 32 are possible depending on the particular chain drive structure and arrangement of the chain gear 36 and/or electrical power generator 32.

The second frame 28 is provided with a chain pulley 40 for changing the direction of the retractable chain 20 from upward at an angle to downward. The chain pulley 40 is located above and spaced apart from the chain pulley 36.

The retractable cord pulley 24, first chain pulley 36, and second chain pulley 40 can be provided with bearings (e.g. sealed bearings and/or moisture resistant bearings) to facilitate low friction rotation thereof in a water environment.

The support 12 is provided with one or more guides 42 (FIG. 2) for maintaining the retractable cord 16 along a vertical pathway within the vertical tunnel 12A of the support 12. For example, the guides 42 are a plurality of U-shaped brackets connected on the inside surface of the vertical tunnel 12A, and are vertically aligned relative to each other to define a vertical pathway for accommodating movement of the retractable cord 16 within the vertical tunnel 12A.

The wave power generating device 10 is driven and operated by wave action of the waves at or in proximity to the location of the wave power generating device 10. Specifically, the float 18 is moved upwardly and downwardly within the tunnel or cavity 12A of the support 12 by the wave action. When the float 18 moves upwardly by a wave, the retractable cord 16 pulls the end 20A of the chain 20 downwardly and extends from the retractable cord 16 from the retractable cord device 14 causing the retractable chain 20 to rotate the electrical power generator 32. When the float 18 moves downwardly by a wave, the retractable cord 16 is pulled upwardly by the end 20A of the chain 20 and the retractable cord 16 is retracted back into the retractable cord device 14 causing the retractable chain 20 to rotate the electrical power generator 32. Again, the electrical power generator can be driven in one or both directions of movement of the chain 20

Figure 4:
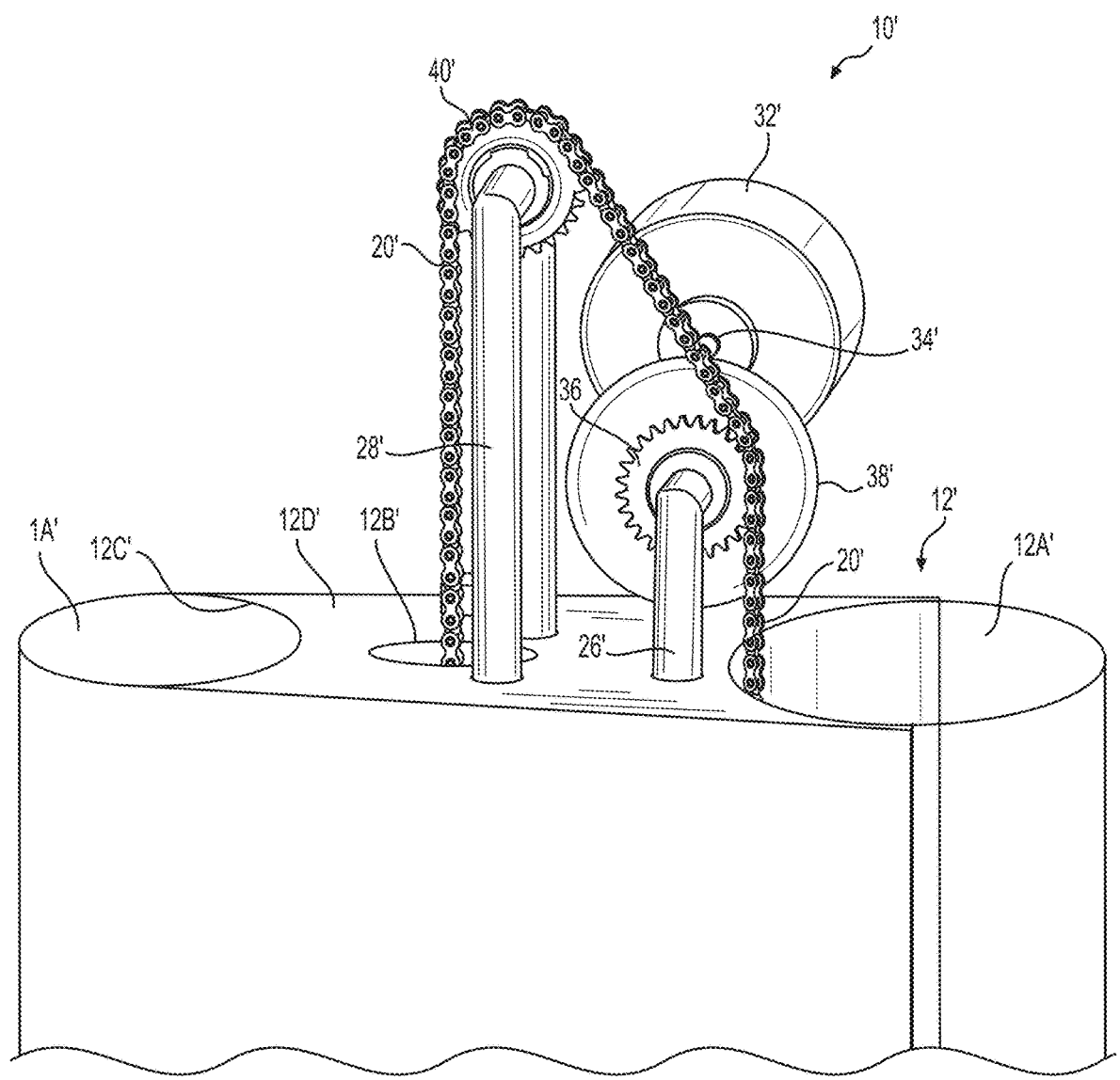
FIG. 4 is another perspective view of the power generating device shown in FIG. 3.
Figure 5:
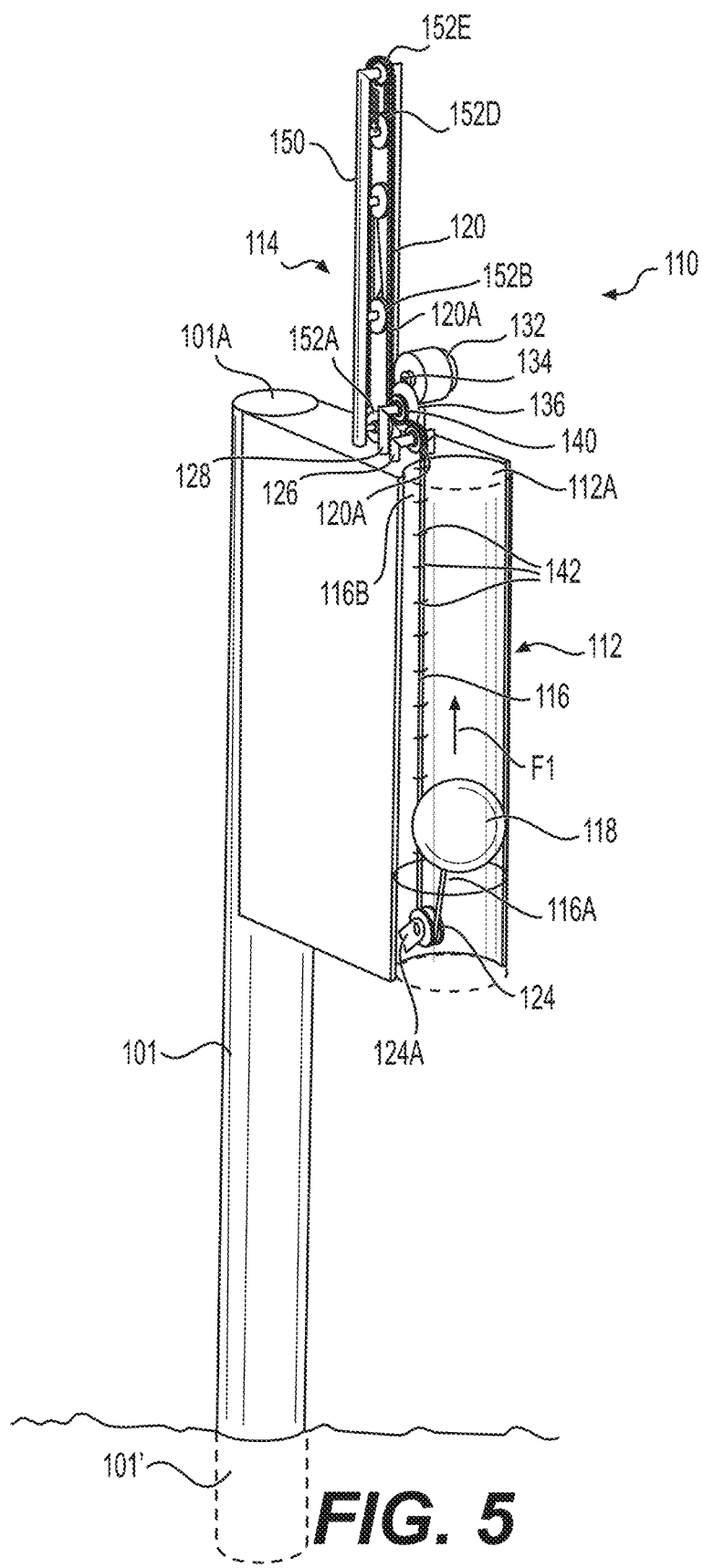
FIG. 5 is a perspective view of a second power generating device according to the present invention.

The retractable cord device 14 shown in FIGS. 1 and 2 is shown modified as retractable cord device 14' in FIGS. 3 and 4.

The modified retractable cord device 14' comprises a pinion gear 34' mounted directly onto the output shaft of the electrical power generator 32', as shown in FIGS. 3 and 4. The pinion gear 34' cooperates with and is driven by the spur gear 38', which is driven by movement of the chain 20'. The chain gear 36' is connected to the spur gear 38', and rotates therewith. The retractable chain 20' cooperates with and drives chain gear 36', spur gear 38', and the electrical power generator 32' when moving in one direction and/or in both directions depending on the particular configuration of the gear drive and/or electrical power generator 32'. For example, the chain gear 36' and spur gear 38' can be configured to allow the chain gear 36' to freewheel when the retractable chain 20' moves in one direction relative to the chain gear 36'. Specifically, a free wheel mechanism or connection can be provided with the chain gear 36' and/or the spur gear 38' to provide a chain drive arrangement so that the chain gear 36' and the spur gear 38' drives the electrical power generator 32' in one direction of rotation and then freewheels when the retractable chain 20' moves in the opposite direction of rotation. Alternatively, the chain gear 36' can be fixed to the spur gear 38' so that the retractable chain 20' drives the electrical power generator 32 in both directions of rotation. The back-and-forth movement of the retractable chain 20' engaging the chain gear 36' drives the pinion gear 34' and electrical power generator 32' is both directions of rotation. Thus, various combinations of engagement and/or disengagement of the retractable moving chain 20' driving the electrical power generator 32' are possible depending on the particular chain drive arrangement and electrical power generator selected.

A second wave power generating device 110 according to the present invention is shown in FIGS. 5-9. In this wave power generating device 110, a spring type chain drive arrangement for the retractable cord device 114 replaces the weight type chain drive arrangement of the wave power generating device 10 shown in FIGS. 1-3. The structure and arrangement of the combined retractable cord and chain drive arrangement cooperating with the electrical power generator are the same as that described above for the first wave power generating device 10 shown in FIGS. 1-3.

Figure 6:
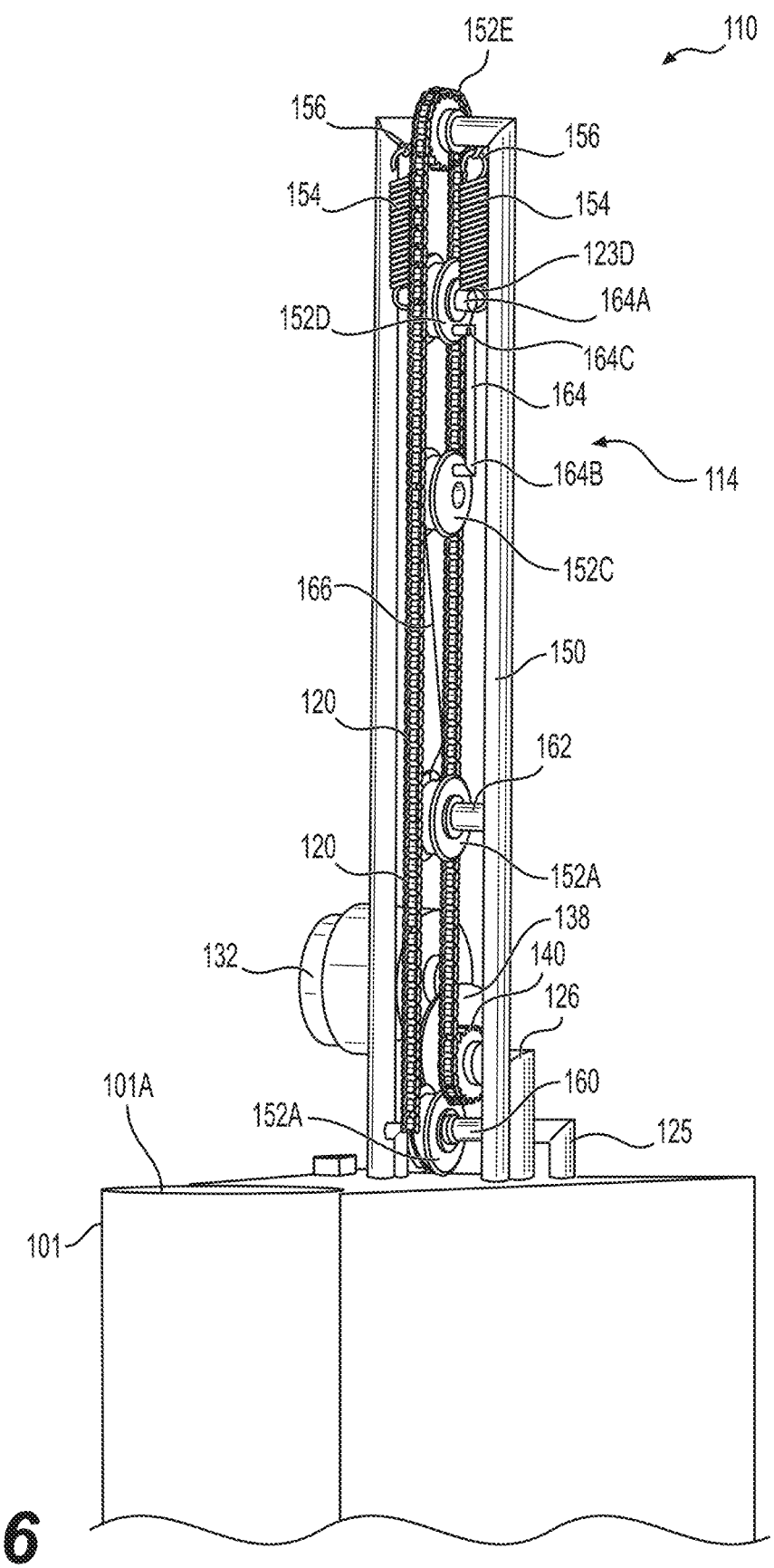
FIG. 6 is another perspective view of the second power generating device shown in FIG. 5.
Figure 7:
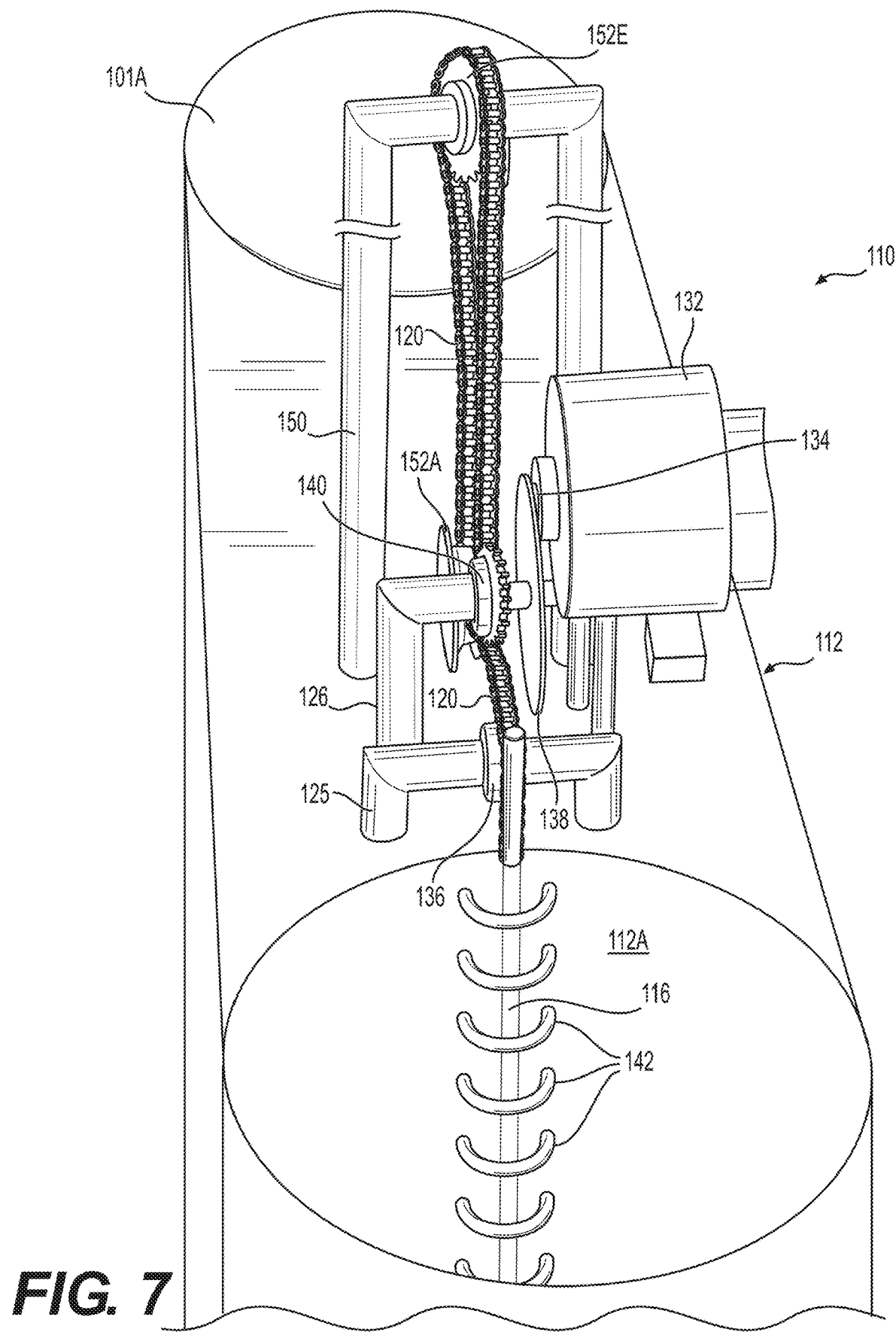
FIG. 7 is a further perspective view of the second power generating device shown in FIG. 5.
Figure 8:
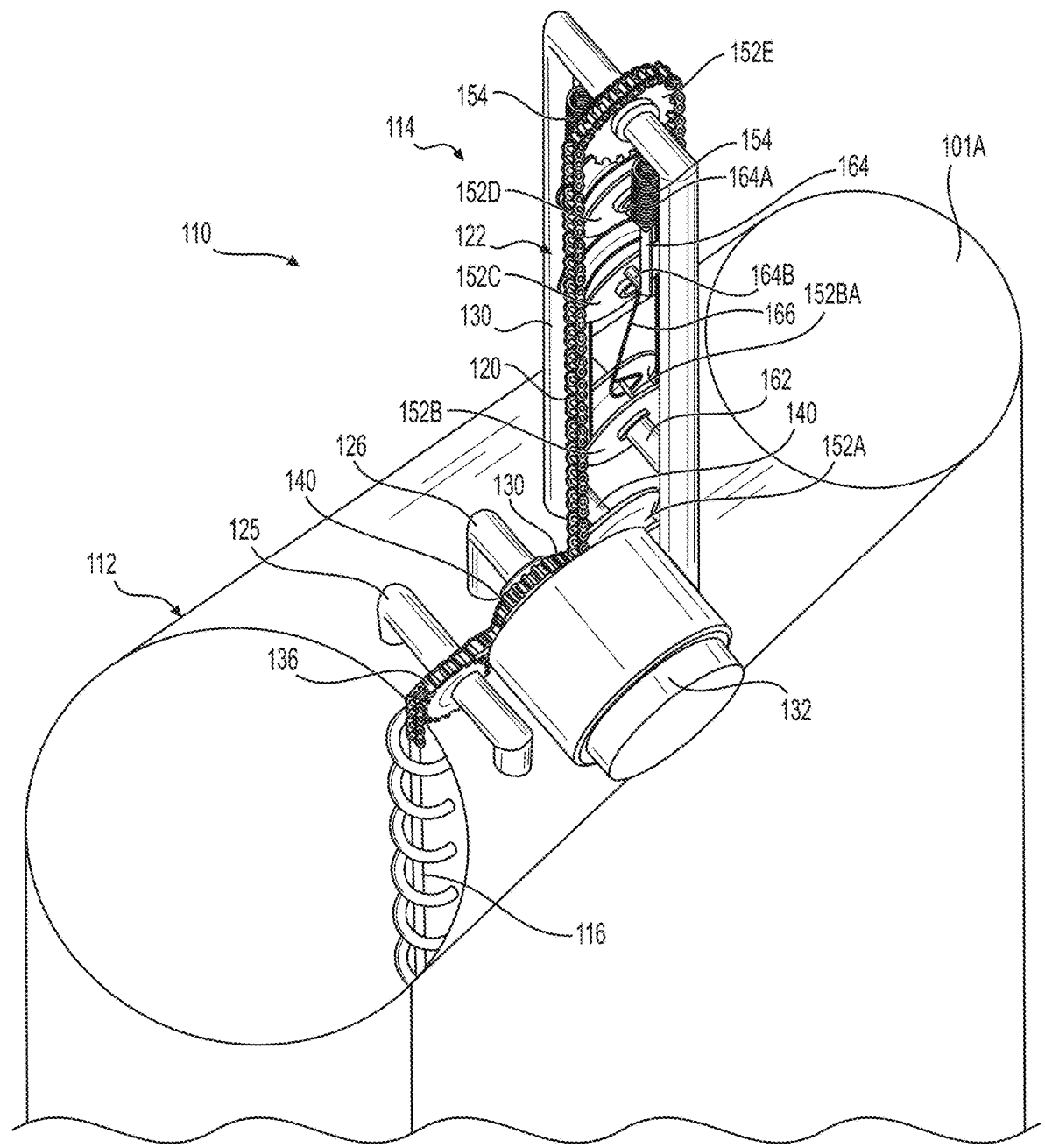
FIG. 8 is an even further perspective view of the second power generating device shown in FIG. 5.

The second wave power generating device comprises a retractable cord device 114, as shown in detail in FIGS. 6 and 7. The retractable cord device 114 comprises a first frame 125 supporting chain pulley 136; a second frame 126 supporting chain pulley 140, spur gear 138, pinion gear 132, and electrical generator 132; and a third frame 150 supporting chain pulleys 152A, 152B, 152C, 152D, 152E, springs 154, spring anchors 156, axles 160, 162, hangers 164 with chain pulley axles 164A, 164B, spring anchors 164C (e.g. through holes in hangers 164), retractable cord 166, and retractable cord anchor 152BA provided on chain pulley 152B.

Figure 9:
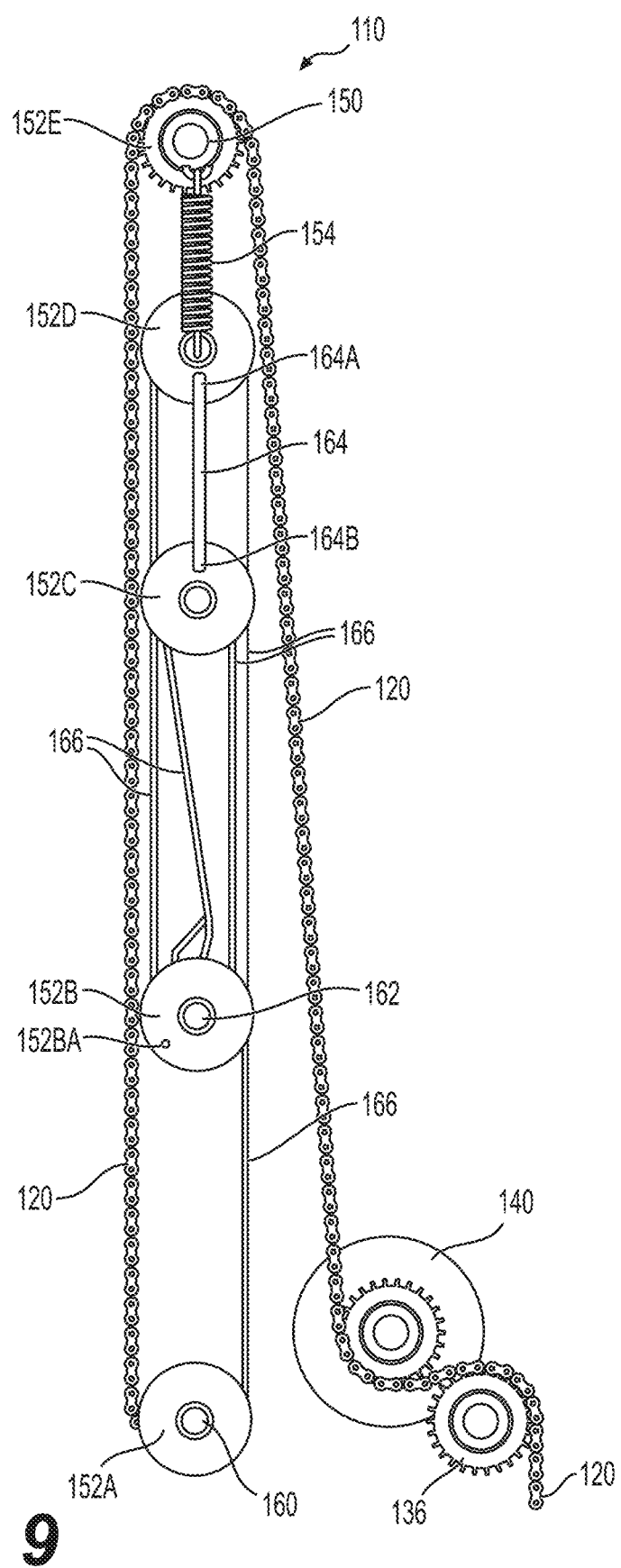
FIG. 9 is a diagrammatic side view of the second power generating device shown in FIG. 5.
Figure 10:
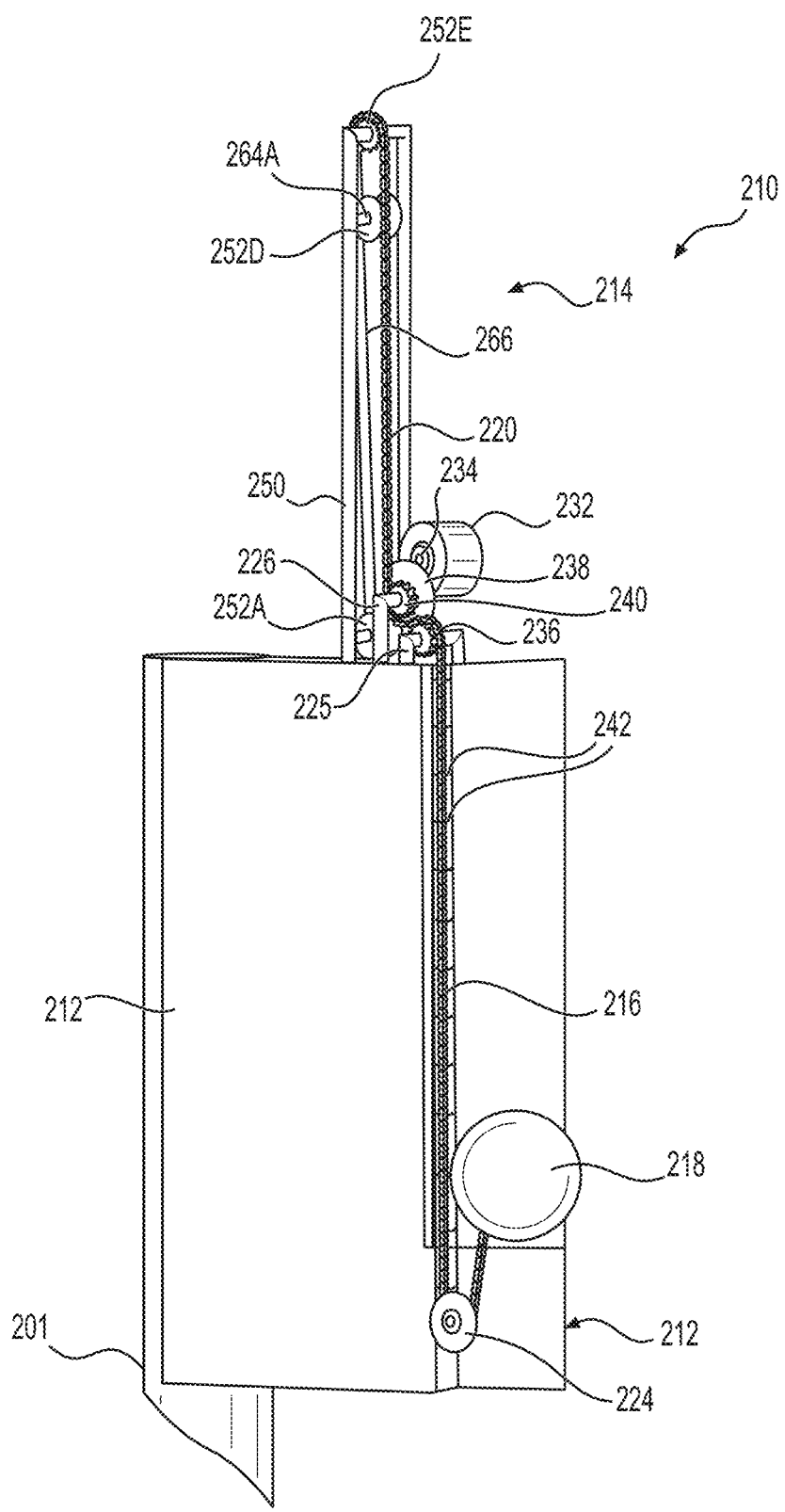
FIG. 10 is a perspective view of a third power generating device according to the present invention.

The retractable chain 120 is connected to the retractable cord 166, and transitions from the retractable chain 120 to the retractable cord 166 on or at the chain pulley 152A, as shown in FIG. 9. The retractable cord 166 extends upwardly to pulley 152D and then downwardly to pulley 152B and then again upwardly to pulley 152C, and then again downwardly to pulley 152B where the end of the retractable cord 166 is anchored to pulley 152B.

When the retractable cord 116 is retracted from the wave power generating device 110 due the float 118 rising from an incoming wave, the retractable chain 120 is simultaneously retracted and pulls on the retractable cord 166 of the retractable cord device 114 to place the retractable cord 166 under tension. As a result of this tension, the springs 154 are stretched and the pulleys 152B, 152C, and 152D further accommodate a length of the retractable cord 166 under tension to provide an accommodating arrangement that will subsequently apply tension on the retractable chain 120 and retractable cord 116 when the wave passes by the wave power generating device 110.

A third wave power generating device 210 according to the present invention is shown in FIGS. 10-13. In this wave power generating device 210, a spring type chain drive arrangement for the retractable cord device 214 replaces the weight type chain drive arrangement of the wave power generating device 10 shown in FIGS. 1-3. The structure and arrangement of the combined retractable cord and chain drive arrangement cooperating with the electrical power generator are the same as that described above for the first wave power generating device 10 shown in FIGS. 1-3.

Figure 11:
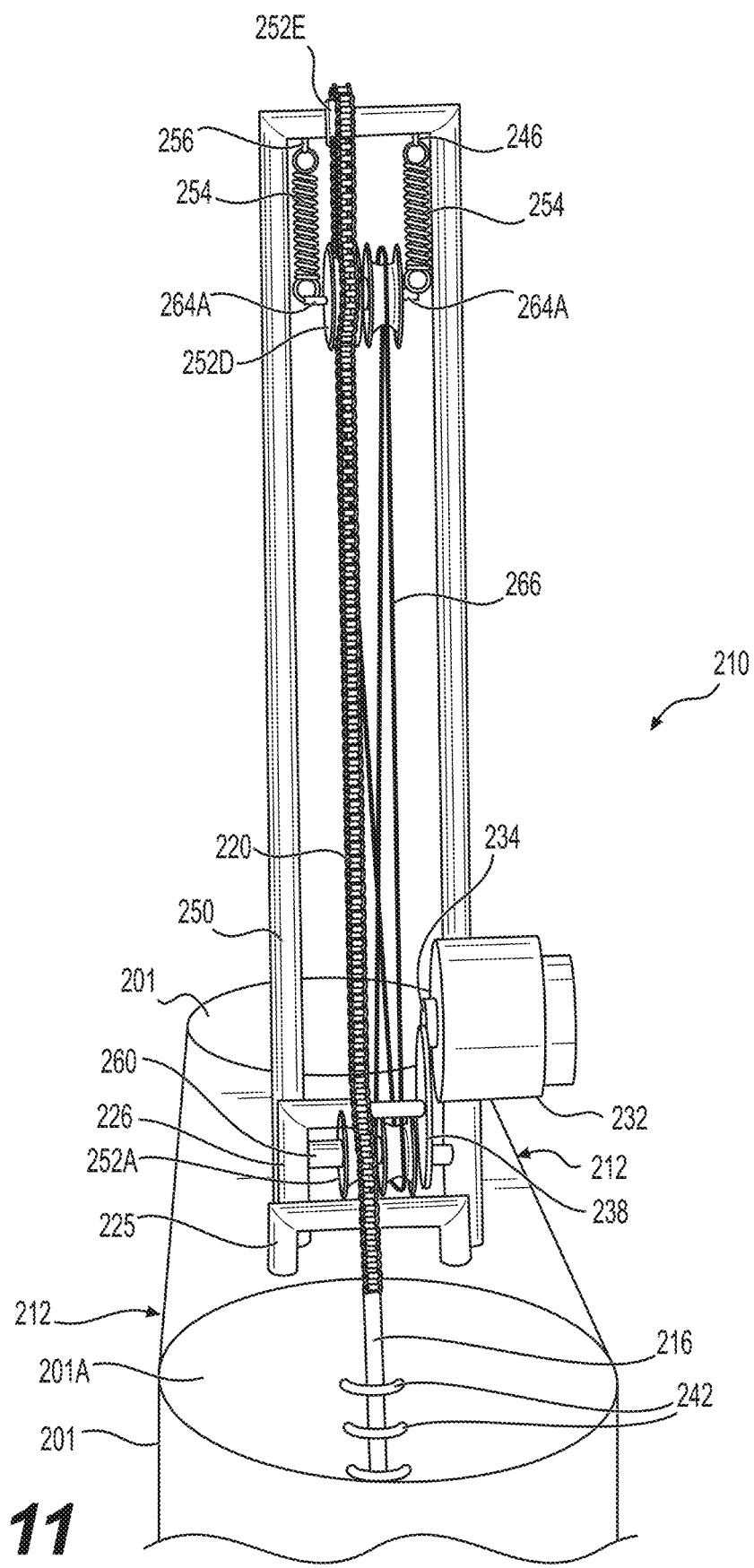
FIG. 11 is another perspective view of the third power generating device shown in FIG. 10.
Figure 12:
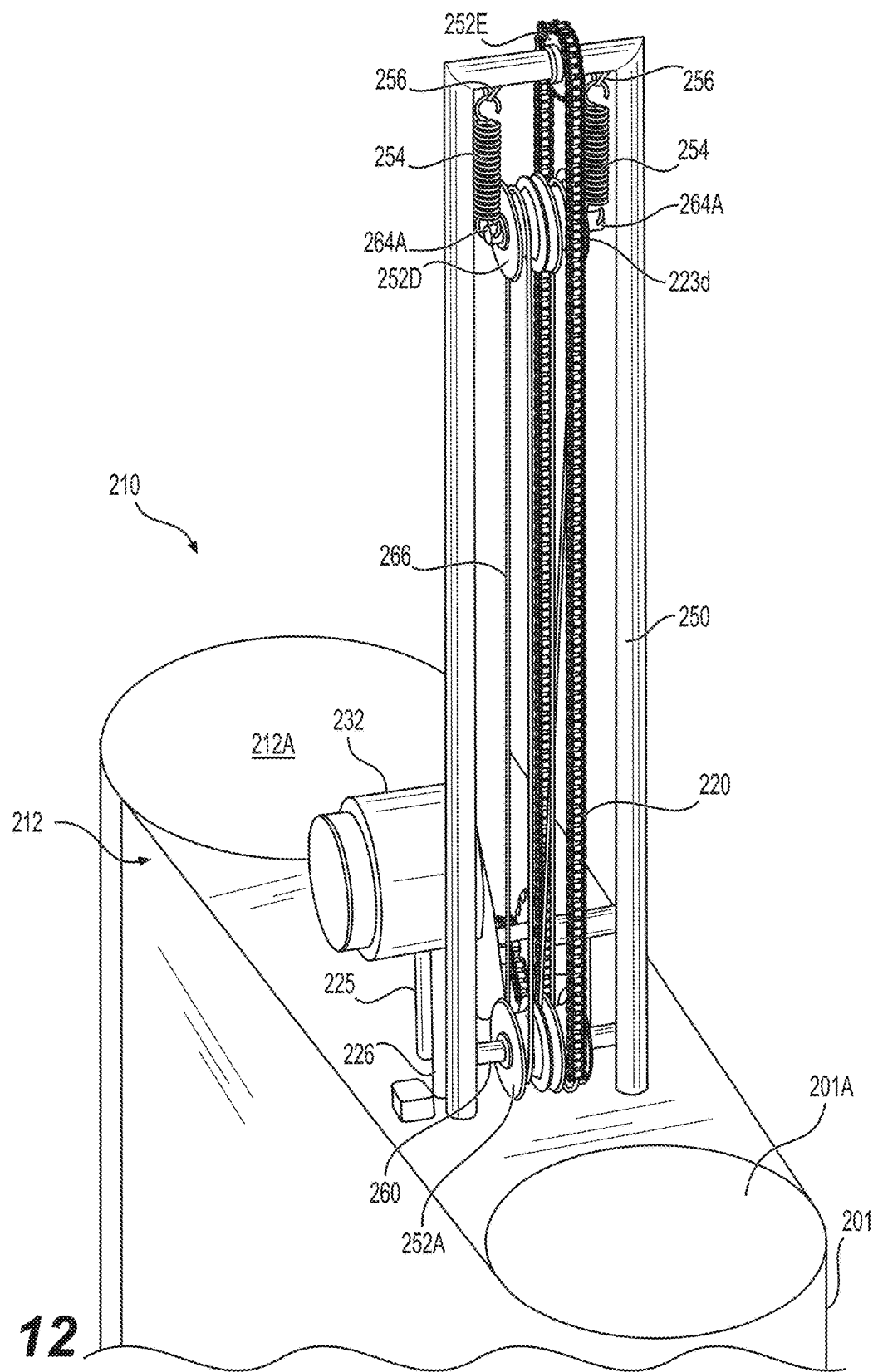
FIG. 12 is a further perspective view of the third power generating device shown in FIG. 10.
Figure 13:
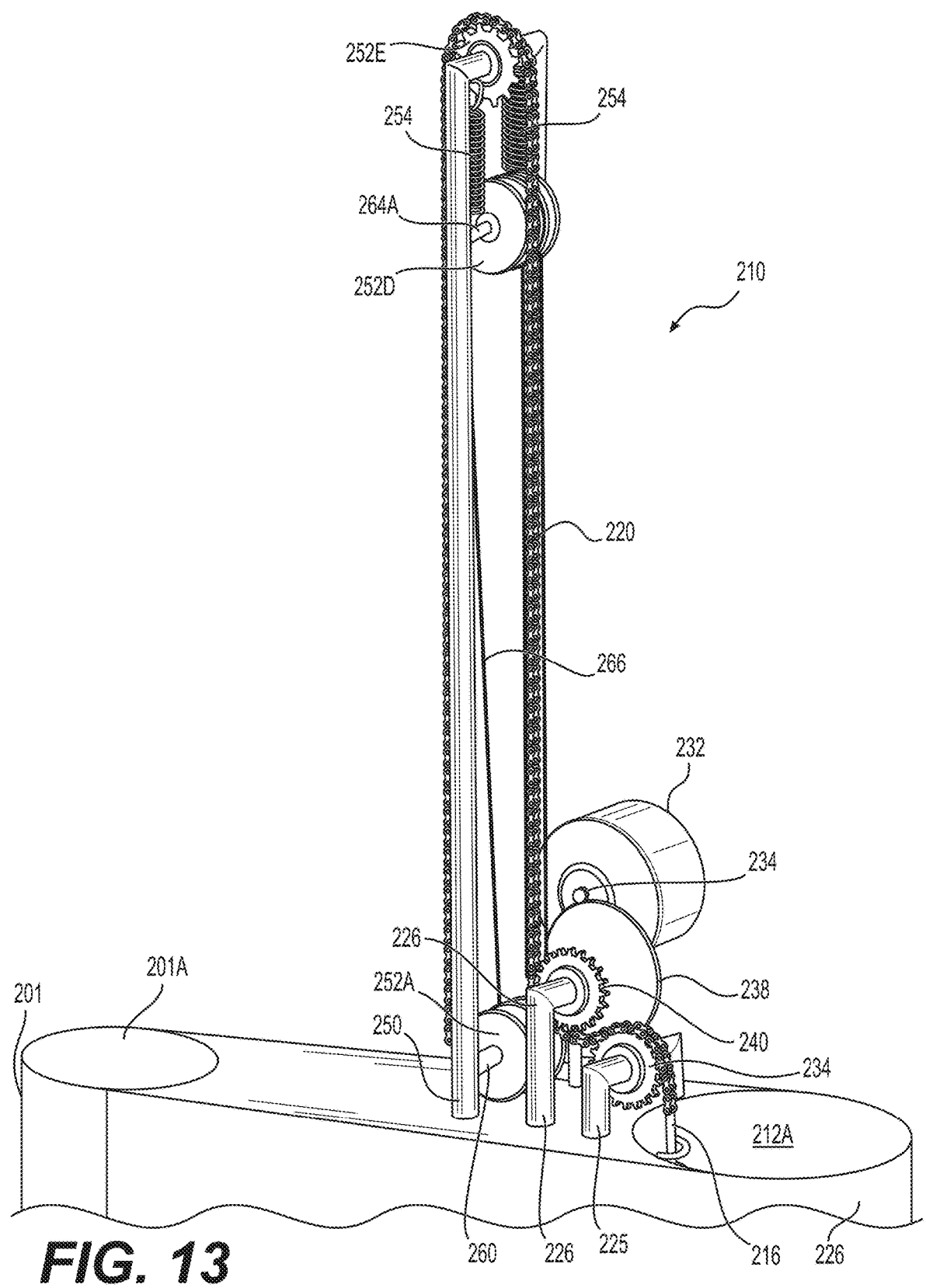
FIG. 13 is an even further perspective view of the third power generating device shown in FIG. 10.

The second wave power generating device 210 comprises a retractable cord device 214, as shown in detail in FIGS. 11-13. The retractable cord device 214 comprises a first frame 225 supporting chain pulley 236; a second frame 226 supporting chain pulley 240, spur gear 238, pinion gear 234, and electrical generator 232; and a third frame 250 supporting chain pulleys 252A, 252D, 252E.

The retractable chain 220 is connected to the retractable cord 266, and transitions from the retractable chain 220 to the retractable cord 266 on or at the chain pulley 252A, as shown in FIG. 12. The retractable cord 266 then extends upwardly to pulley 252D and then down to pulley 252A where it is anchored.

When the retractable cord 216 is retracted from the wave power generating device 210 due the float 218 rising from an incoming wave, the retractable chain 220 is simultaneously retracted and pulls on the retractable cord 266 of the retractable cord device 214 to place the retractable cord 266 under tension. As a result of this tension, the springs 254 are stretched and the pulleys 252A, 252D, and 252E further accommodate a length of the retractable cord 266 under tension to provide an accommodating arrangement that will subsequently apply tension on the retractable chain 220 and retractable cord 216 to retract the retractable chain 220 and retractable cord 216 into the retractable device when the wave passes by the wave power generating device 210.

Figure 14:
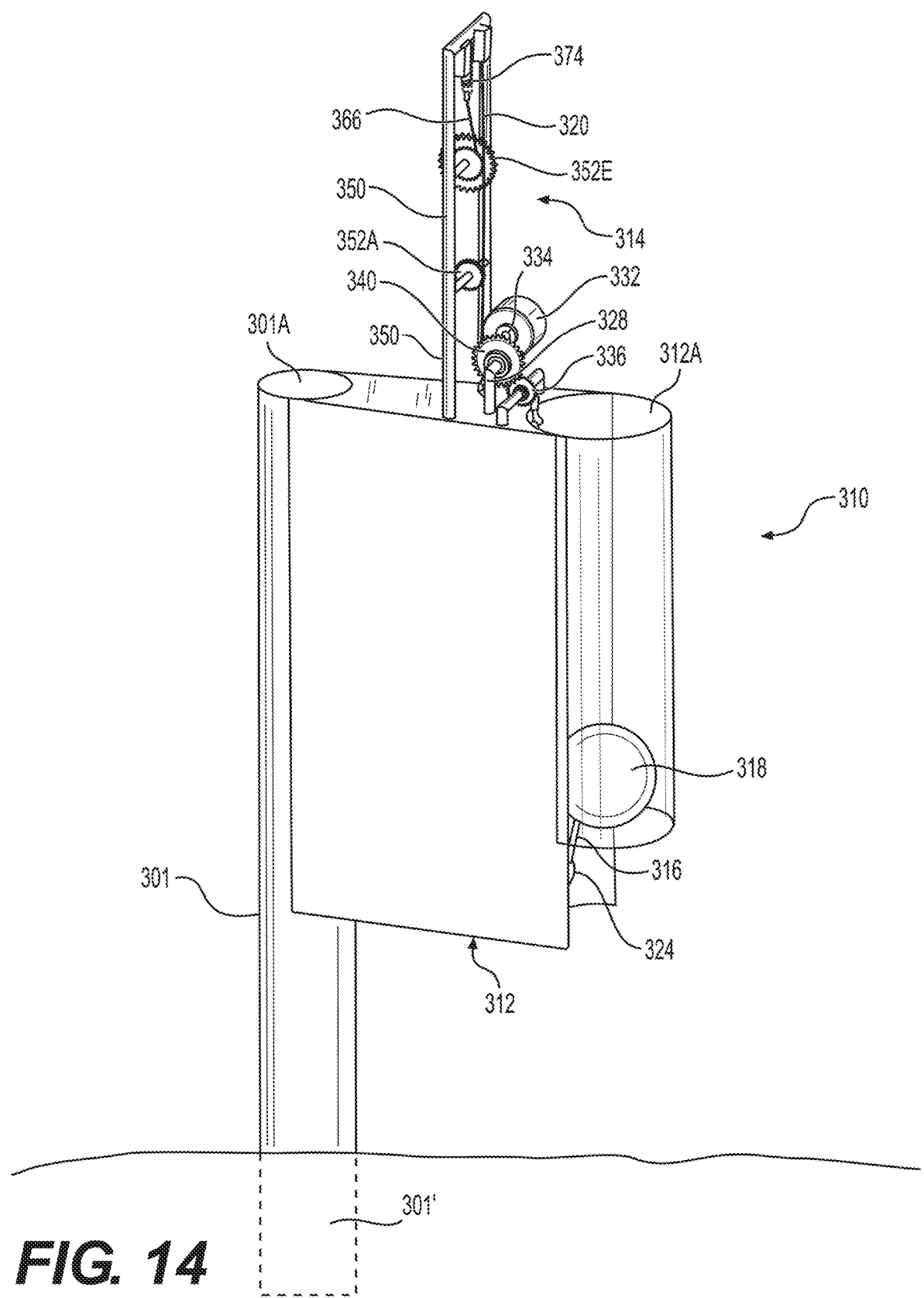
FIG. 14 is a perspective view of a fourth power generating device according to the present invention.
Figure 15:
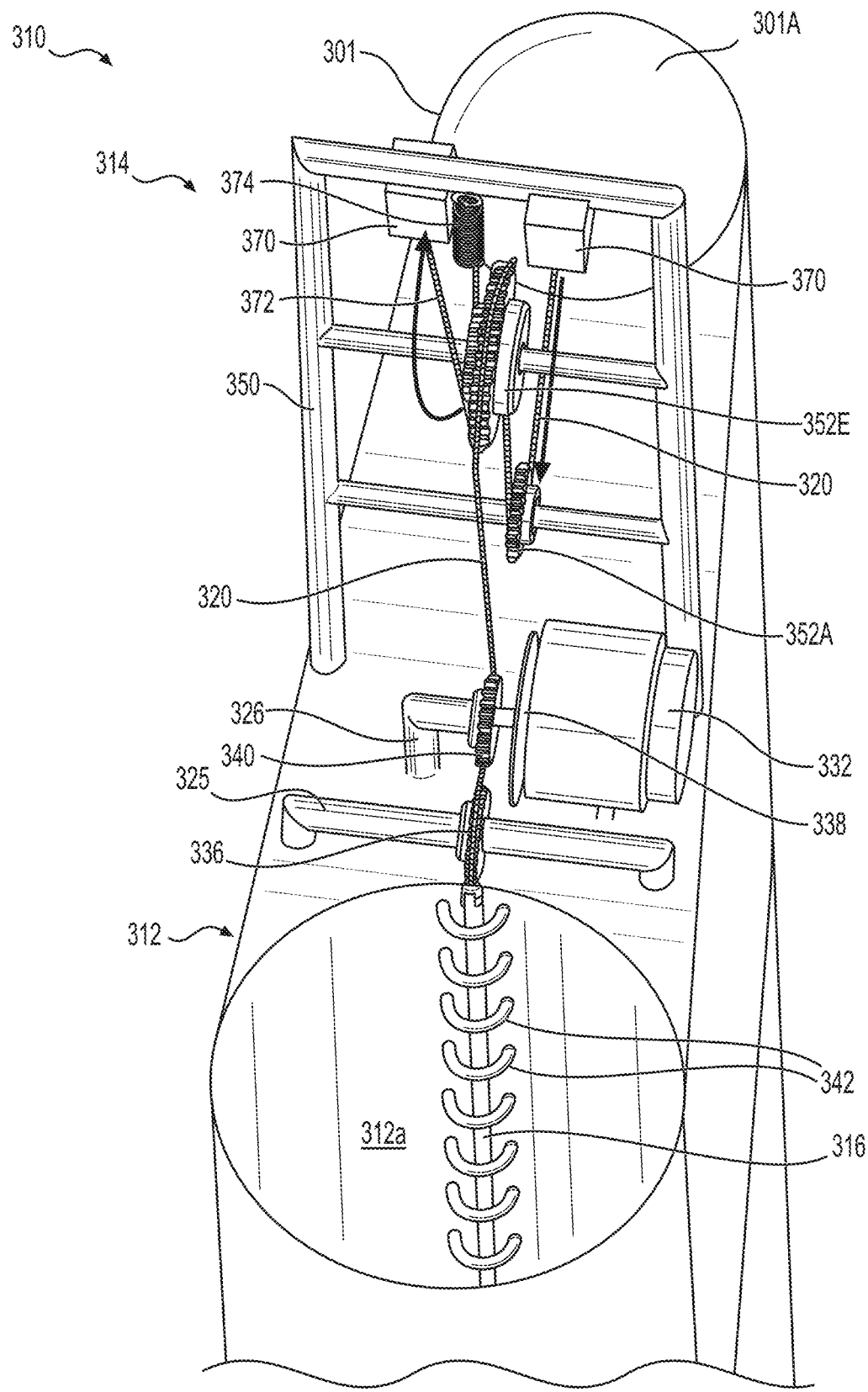
FIG. 15 is another perspective view of the fourth power generating device shown in FIG. 14.

A fourth wave power generating device 310 according to the present invention is shown in FIGS. 14 and 15. In this wave power generating device 310, a spring type retractable device drive arrangement for the retractable cord device 314 replaces the weight type chain drive arrangement of the wave power generating device 10 shown in FIGS. 1-3. The structure and arrangement of the combined retractable cord and chain drive arrangement cooperating with the electrical power generator are the same at that described above for the first wave power generating device 10 shown in FIGS. 1-3.

The fourth wave power generating device 310 comprises a retractable cord device 314, as shown in detail in FIG. 15. The retractable cord device 314 comprises a first frame 325 supporting chain pulley 336; a second frame 326 supporting chain pulley 340, spur gear 338, pinion gear 334, and electrical generator 332; and a third frame 350 supporting a chain pulleys 352A and 352E, chain retracting devices 370, and a spring 374 connected to a chain 372. The chain pulleys 352E and 352A each comprise two side-by-side pulleys located, respectively, on a same axle.

The retractable chain 320 is connected to the retractable cord 316. The retractable chain 320 is connected at one end to the chain retracting device 370. The retractable chain 320 extends upwardly from chain pulley 340 to chain pulley 352E, and then downwardly to chain pulley 252A, and then again upwardly to chain retracting device 370.

The retractable device 370 is configured to reel the retractable chain 320 into the chain retracting device 370 under spring tension. For example, the chain retracting device 370 comprises a spring biased reel having a spiral-shaped spring inside of a housing of the chain retracting device 370.

The chain pulley 352E comprises a larger chain pulley 352EA connected side-by-side to a smaller chain pulley 352EB. Another chain 372 is connected at one end to spring 374 and connected at an opposite end to another chain retracting device 370. The spring 374 is supported on an upper cross-member of the third frame 350.

When the retractable cord 316 is pulled or retracted from the wave power generating device 310 due the float 318 rising from an incoming wave, the retractable chain 320 is pulled out of the chain retracting device 370 under spring tension. Further, the other chain 372 is also pulled out of the other chain retracting device 370 under spring tension. After the wave passes by, the chain retracting devices 370 reel the retractable chain 320 and other chain 372 back into the chain retracting devices 370.

A fifth wave power generating device 410 according to the present invention is shown in FIGS. 16-19. In this wave power generating device 410, a weight type chain drive arrangement for the retractable cord device 414 is similar to the chain drive arrangement of the wave power generating device 10 shown in FIGS. 1-3. The structure and arrangement of the combined retractable cord and chain drive arrangement cooperating with the electrical power generator are the same at that described above for the first wave power generating device 10 shown in FIGS. 1-3.

Figure 16:
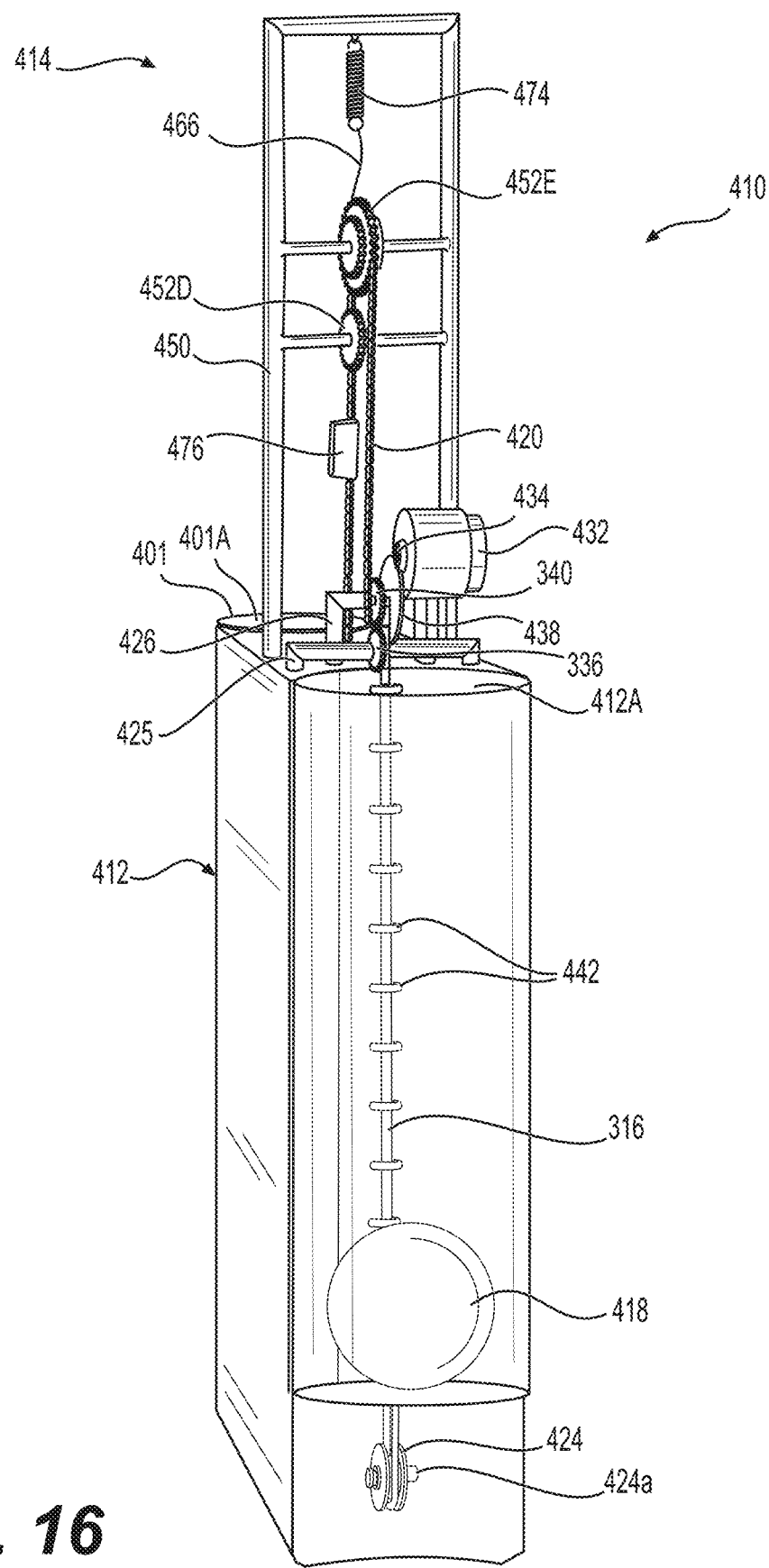
FIG. 16 is a perspective view of a fifth power generating device according to the present invention.
Figure 17:
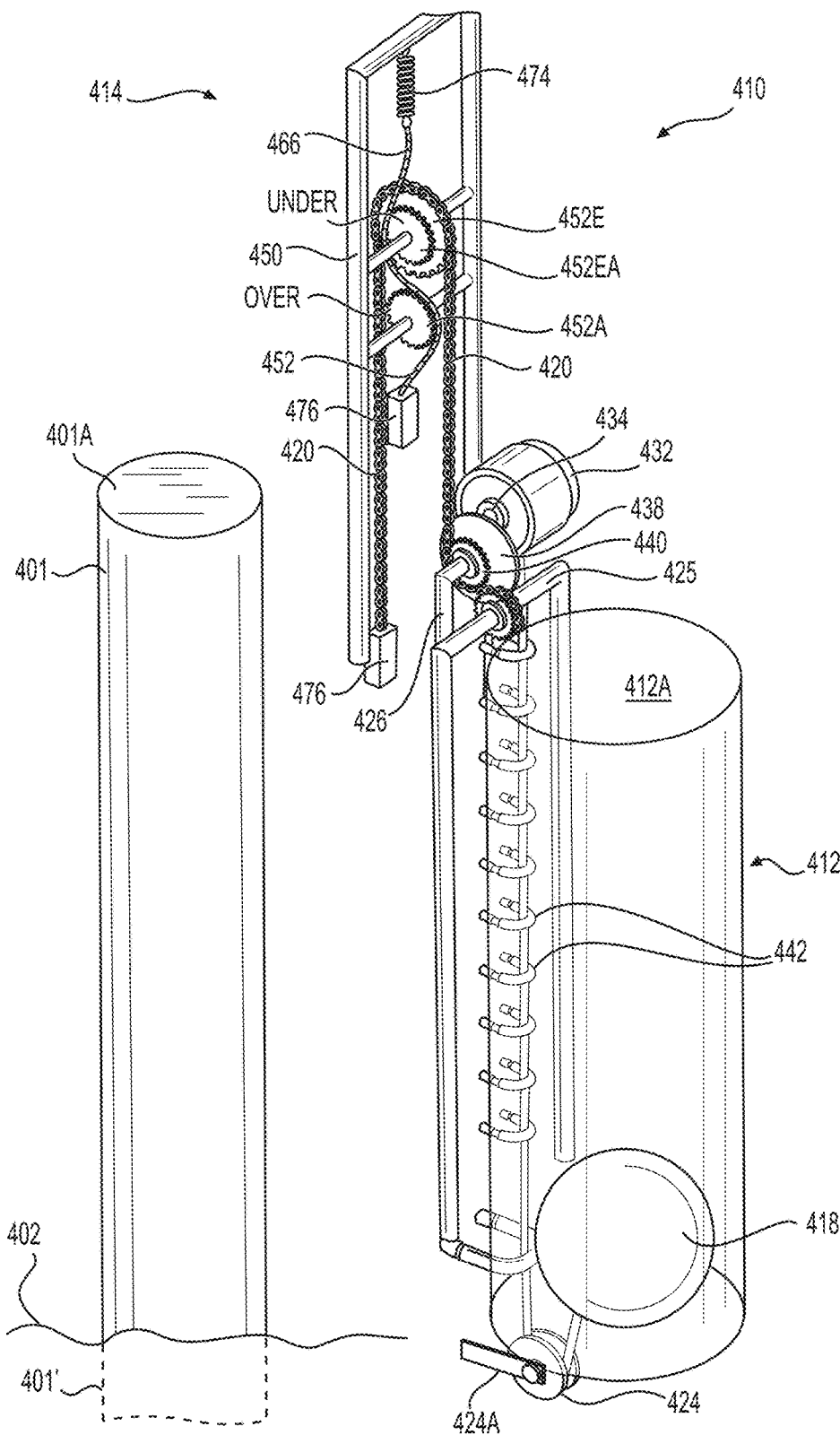
FIG. 17 is another perspective view of the fifth power generating device shown in FIG. 16.
Figure 18:
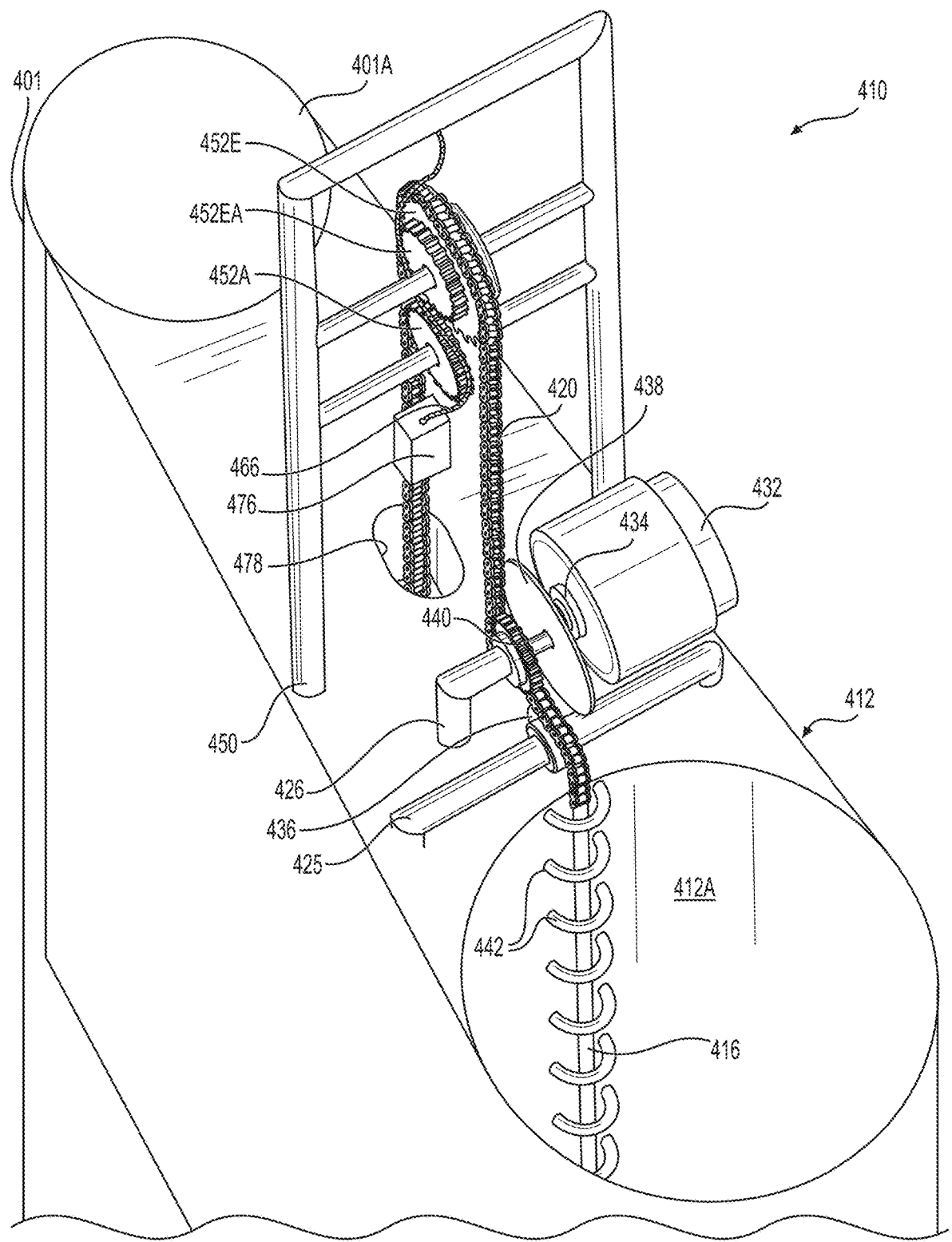
FIG. 18 is a further perspective view of the fifth power generating device shown in FIG. 16.
Figure 19:
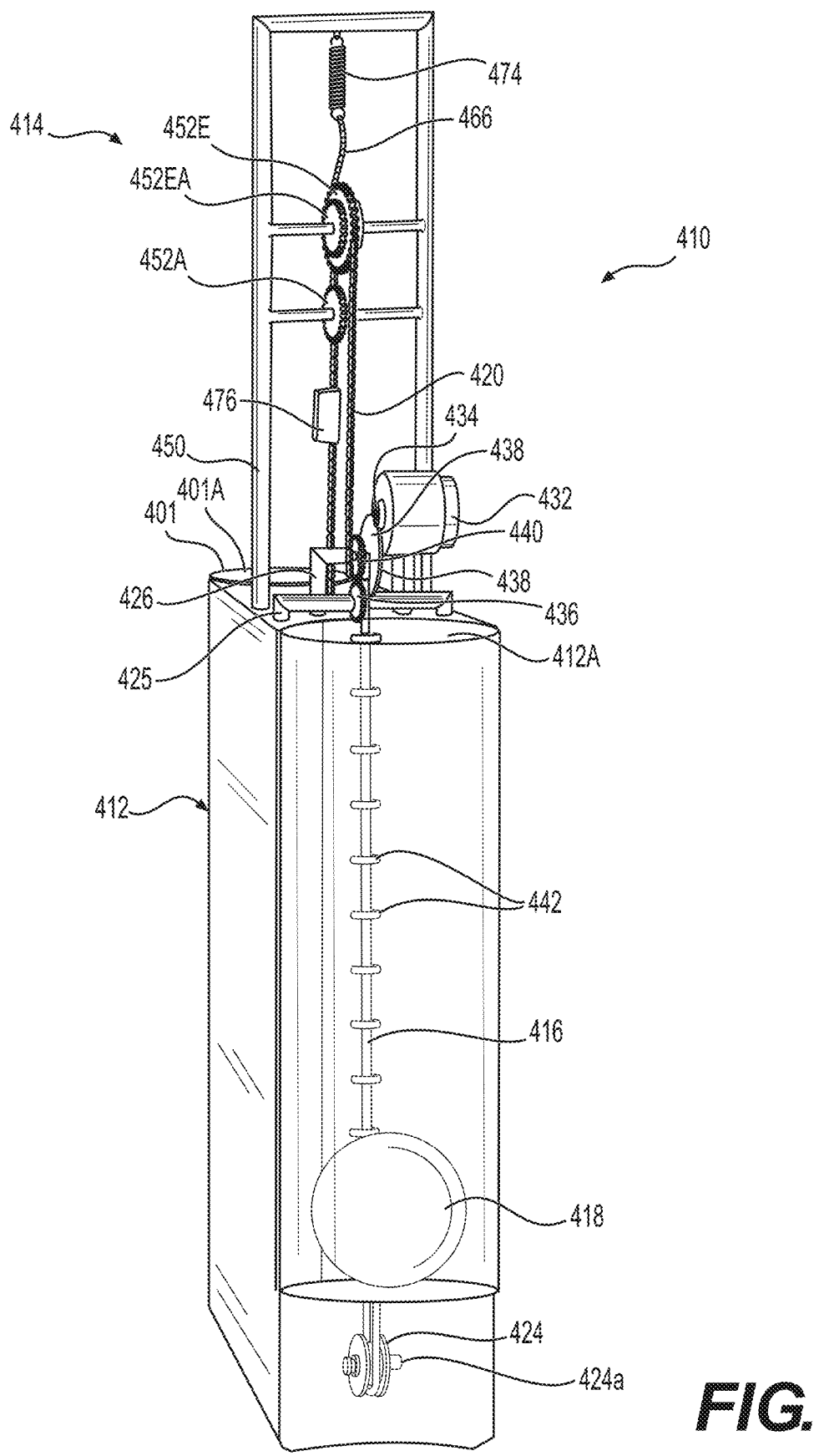
FIG. 19 is an even further perspective view of the fifth power generating device shown in FIG. 16.

The fifth wave power generating device 410 comprises a retractable cord device 414, as shown in detail in FIGS. 16 and 17. The retractable cord device 414 comprises a first frame 425 supporting chain pulley 436; a second frame 426 supporting chain pulley 440, spur gear 438, pinion gear 434, and electrical generator 432; and a third frame 450 supporting a chain pulleys 452A, 452E, 452EA, and spring 474. The chain pulleys 452E and 452EA each comprise two side-by-side pulleys located, respectively, on a same axle.

The retractable chain 220 extends upwardly from chain pulley 440 to chain pulley 452E and then downwardly. The end of the retractable chain 220 is fitted with a weight 476. Another chain 466 is connected at one end to the spring 474 and connected at an opposite end to weight 476.

When the retractable cord 416 is retracted from the wave power generating device 410 due the float 418 rising from an incoming wave, the retractable chain 420 simultaneously lifts the weight 476. Further, the other weight 476 is also lifted by the other chain 466. When the wave passes, the weights 476, 476 both pull on and retract the retractable chain 420 and retractable cord 416 into the retractable cord device 414.

The invention claimed is:
1. A wave power generating device, comprising:
a support;
an electrical power generating device mounted on the support, the electrical power generating device comprising an input shaft;
a gear pulley connected to input shaft of the electrical power generating device;

a retractable chain cooperating with the gear pulley of the electrical power generating device to drive the electrical power generating device;
a float connected to one end of the retractable chain; and
a retractable cord device connected to an opposite end of the retractable chain, the retractable cord device configured for allowing the retractable chain to be pulled out of the retractable cord device under tension and retracting the retractable chain under tension, the retractable cord device comprising multiple frame members each fitted with at least one chain pulley to cooperate with the retractable chain, the retractable cord device comprising two or more spaced apart vertically oriented frame members,
wherein the retractable chain is pulled out of the retractable cord device by an incoming wave lifting the float, and is retracted by the retractable cord device by the retractable cord device when the wave is moving past the float, and
wherein the retractable chain drives the electrical power generating device in at least one direction of movement of the retractable chain due to wave movement.

2. The device according to claim 1, wherein the multiple frame members have different heights.

3. The device according to claim 1, wherein the electrical power generating device is an electrical generator.

4. The device according to claim 1, wherein the retractable cord device comprises at least one weight.

5. The device according to claim 4, wherein the weight is configured for maintaining tension on the retractable chain.

6. The device according to claim 4, wherein the weight is configured for retracting the retractable chain by the retractable cord device.

7. The device according to claim 1, wherein the retractable cord device comprises at least one spring.

8. The device according to claim 7, wherein the spring is configured for maintaining tension on the retractable chain.

9. The device according to claim 7, wherein the spring is configured for retracting the retractable chain by the retractable cord device.

10. The device according to claim 1, wherein the retractable cord device comprises a retractable chain accumulator.

11. The device according to claim 10, wherein the accumulator comprises multiple chain pulleys for supporting the retractable chain under tension.

12. The device according to claim 11, wherein the accumulator further comprises at least one weight configured for maintaining the retractable chain under tension.

13. The device according to claim 11, wherein the accumulator further comprises at least one spring configured for maintaining the retractable chain under tension.

14. The device according to claim 1, wherein the retractable cord device comprises multiple frame members each fitted with at least one chain pulley to cooperate with the retractable chain.

15. The device according to claim 1, wherein the retractable cord device is configured to drive the electrical power generating device in both directions of movement of the retractable chain.

16. The device according to claim 1, wherein the support is configured to mount the retractable cord device on the support, the support being configured so that the float is subject to wave action.

17. The device according to claim 16, wherein the support is a dock or pier or piling.

18. The device according to claim 1, wherein the retractable cord device is configured to drive the electrical power generating device in both directions of movement of the retractable chain.

19. A wave power generating device, comprising:
a support;
an electrical power generating device mounted on the support, the electrical power generating device comprising an input shaft;
a gear pulley connected to input shaft of the electrical power generating device;
a retractable chain cooperating with the gear pulley of the electrical power generating device to drive the electrical power generating device;
a float connected to one end of the retractable chain; and
a retractable cord device connected to an opposite end of the retractable chain, the retractable cord device configured for allowing the retractable chain to be pulled out of the retractable cord device under tension and retracting the retractable chain under tension,
wherein the retractable chain is pulled out of the retractable cord device by an incoming wave lifting the float, and is retracted by the retractable cord device under tension by the retractable when the wave is moving past the float, and
wherein the retractable chain drives the electrical power generating device in at least one direction of movement of the retractable chain due to wave movement;
wherein the retractable chain drives the electrical power generating device in both directions of movement of the retractable chain.

20. A wave power generating device, comprising:
a support;
an electrical power generating device mounted on the support, the electrical power generating device comprising an input shaft;
a gear pulley connected to input shaft of the electrical power generating device;
a retractable chain cooperating with the gear pulley of the electrical power generating device to drive the electrical power generating device;
a float connected to one end of the retractable chain; and
a retractable cord device connected to an opposite end of the retractable chain, the retractable cord device configured for allowing the retractable chain to be pulled out of the retractable cord device under tension and retracting the retractable chain under tension, the retractable cord device comprising a weight or spring for retracting the retractable chain under tension, the retractable cord device comprising multiple frame members each fitted with at least one chain pulley to cooperate with the retractable chain, the retractable cord device comprising two or more spaced apart vertically oriented frame members,
wherein the retractable chain is pulled out of the retractable cord device by an incoming wave lifting the float, and is retracted by the retractable cord device under tension when the wave is moving past the float, and
wherein the retractable chain drives the electrical power generating device in at least one direction of movement of the retractable chain due to wave movement.

* * * * *